US012121898B2

(12) United States Patent
Weitz et al.

(10) Patent No.: US 12,121,898 B2

(45) **Date of Patent: *Oct. 22, 2024**

(54) DROPLET CREATION TECHNIQUES

(71) Applicant: President and Fellows of Harvard College, Cambridge, MA (US)

(72) Inventors: David A. Weitz, Cambridge, MA (US); Adam R. Abate, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 849 days.

This patent is subject to a terminal disclaimer.

(21) Appl. No.: 17/148,287

(22) Filed: Jan. 13, 2021

(65) Prior Publication Data

US 2021/0229099 A1 Jul. 29, 2021

Related U.S. Application Data

(63) Continuation of application No. 15/791,068, filed on Oct. 23, 2017, now Pat. No. 11,000,849, which is a (Continued)

(51) Int. Cl.

*B01L 3/00* (2006.01)

*B01F 23/41* (2022.01)

(Continued)

(52) U.S. Cl.

CPC ........ *B01L 3/502761* (2013.01); *B01F 23/41* (2022.01); *B01F 33/3011* (2022.01);

(Continued)

(58) Field of Classification Search

None

See application file for complete search history.

(56) References Cited

U.S. PATENT DOCUMENTS 5,149,625 A 9/1992 Church et al.

5,202,231 A 4/1993 Drmanac et al.

(Continued)

FOREIGN PATENT DOCUMENTS

EP 0 249 007 A2 12/1987

EP 1 019 496 B1 9/2004

(Continued)

OTHER PUBLICATIONS

Australian Office Action mailed Dec. 17, 2013 for Application No. AU 2010315580.

(Continued)

*Primary Examiner* — P. Kathryn Wright

(74) *Attorney, Agent, or Firm* — Wolf, Greenfield & Sacks, P.C.

(57) ABSTRACT

The present invention is generally related to systems and methods for producing droplets. The droplets may contain varying species, e.g., for use as a library. In some cases, at least one droplet is used to create a plurality of droplets, using techniques such as flow-focusing techniques. In one set of embodiments, a plurality of droplets, containing varying species, can be divided to form a collection of droplets containing the various species therein. A collection of droplets, according to certain embodiments, may contain various subpopulations of droplets that all contain the same species therein. Such a collection of droplets may be used as a library in some cases, or may be used for other purposes.

16 Claims, 11 Drawing Sheets

Related U.S. Application Data continuation of application No. 14/707,771, filed on May 8, 2015, now Pat. No. 9,839,911, which is a continuation of application No. 13/503,588, filed as application No. PCT/US2010/054050 on Oct. 26, 2010, now Pat. No. 9,056,289.

(60) Provisional application No. 61/255,239, filed on Oct. 27, 2009.

(51) Int. Cl.
*B01F 33/3011* (2022.01)
*B01F 33/302* (2022.01)
*B01L 3/02* (2006.01)

(52) U.S. Cl.
CPC ........ *B01F 33/3021* (2022.01); *B01L 3/0241* (2013.01); *B01L 3/502784* (2013.01); *B01L 2200/0636* (2013.01); *B01L 2200/0652* (2013.01); *B01L 2300/0681* (2013.01); *Y10T 137/0318* (2015.04); *Y10T 137/8593* (2015.04)

(56) References Cited

U.S. PATENT DOCUMENTS 5,436,130 A 7/1995 Mathies et al.
5,512,131 A 4/1996 Kumar et al.
5,695,940 A 12/1997 Drmanac et al.
5,736,330 A 4/1998 Fulton
5,834,252 A 11/1998 Stemmer et al.
5,851,769 A 12/1998 Gray et al.
6,046,003 A 4/2000 Mandecki
6,051,377 A 4/2000 Mandecki
6,057,107 A 5/2000 Fulton
6,103,537 A 8/2000 Ullman et al.
6,297,006 B1 10/2001 Drmanac et al.
6,297,017 B1 10/2001 Schmidt et al.
6,355,198 B1 3/2002 Kim et al.
6,361,950 B1 3/2002 Mandecki
6,432,360 B1 8/2002 Church
6,485,944 B1 11/2002 Church et al.
6,511,803 B1 1/2003 Church et al.
6,524,456 B1 2/2003 Ramsey et al.
6,586,176 B1 7/2003 Trnovsky et al.
6,632,606 B1 10/2003 Ullman et al.
6,670,133 B2 12/2003 Knapp et al.
6,767,731 B2 7/2004 Hannah
6,800,298 B1 10/2004 Burdick et al.
6,806,058 B2 10/2004 Jesperson et al.
6,913,935 B1 7/2005 Thomas
6,929,859 B2 8/2005 Chandler et al.
7,041,481 B2 5/2006 Anderson et al.
7,268,167 B2 9/2007 Higuchi et al.
7,425,431 B2 9/2008 Church et al.
7,536,928 B2 5/2009 Kazuno
7,604,938 B2 10/2009 Takahashi et al.
7,638,276 B2 12/2009 Griffiths et al.
7,708,949 B2 5/2010 Stone et al.
RE41,780 E 9/2010 Anderson et al.
7,799,553 B2 9/2010 Mathies et al.
7,968,287 B2 6/2011 Griffiths et al.
RE43,365 E 5/2012 Anderson et al.
8,252,539 B2 8/2012 Quake et al.
8,273,573 B2 9/2012 Ismagilov et al.
8,278,071 B2 10/2012 Brown et al.
8,304,193 B2 11/2012 Ismagliov et al.
8,329,407 B2 12/2012 Ismagilov et al.
8,748,094 B2 6/2014 Weitz et al.
8,748,102 B2 6/2014 Berka et al.
8,765,380 B2 7/2014 Berka et al.
8,822,148 B2 9/2014 Ismagliov et al.
8,871,444 B2 10/2014 Griffiths et al.
9,017,948 B2 4/2015 Agresti et al.
9,056,289 B2 6/2015 Weitz et al.
9,068,210 B2 6/2015 Agresti et al.
9,127,310 B2 9/2015 Larson et al.
9,132,394 B2 9/2015 Makarewicz, Jr. et al.
9,839,911 B2 12/2017 Weitz et al.
11,000,849 B2 5/2021 Weitz et al.
2001/0020588 A1 9/2001 Adourian et al.
2001/0044109 A1 11/2001 Mandecki
2002/0034737 A1 3/2002 Drmanac
2002/0051992 A1 5/2002 Bridgham et al.
2002/0092767 A1 7/2002 Bjornson et al.
2002/0179849 A1 12/2002 Maher et al.
2003/0008285 A1 1/2003 Fischer
2003/0008323 A1 1/2003 Ravkin et al.
2003/0028981 A1 2/2003 Chandler et al.
2003/0039978 A1 2/2003 Hannah
2003/0044777 A1 3/2003 Beattie
2003/0044836 A1 3/2003 Levine et al.
2003/0104466 A1 6/2003 Knapp et al.
2003/0108897 A1 6/2003 Drmanac
2003/0170698 A1 9/2003 Gascoyne et al.
2003/0182068 A1 9/2003 Battersby et al.
2003/0207260 A1 11/2003 Trnovsky et al.
2003/0215862 A1 11/2003 Parce et al.
2004/0063138 A1 4/2004 McGinnis et al.
2004/0132122 A1 7/2004 Banerjee et al.
2005/0019839 A1 1/2005 Jesperson et al.
2005/0032240 A1 2/2005 Lee et al.
2005/0042625 A1 2/2005 Schmidt et al.
2005/0172476 A1 8/2005 Stone et al.
2005/0181379 A1 8/2005 Su et al.
2005/0221339 A1 10/2005 Griffiths et al.
2005/0244850 A1 11/2005 Huang et al.
2005/0287572 A1 12/2005 Mathies et al.
2006/0020371 A1 1/2006 Ham et al.
2006/0073487 A1 4/2006 Oliver et al.
2006/0078888 A1 4/2006 Griffiths et al.
2006/0102553 A1 5/2006 Danner et al.
2006/0153924 A1 7/2006 Griffiths et al.
2006/0163385 A1 7/2006 Link et al.
2006/0240506 A1 10/2006 Kushmaro et al.
2006/0257893 A1 11/2006 Takahashi et al.
2006/0292583 A1 12/2006 Schneider et al.
2007/0003442 A1 1/2007 Link et al.
2007/0020617 A1 1/2007 Trnovsky et al.
2007/0054119 A1 3/2007 Garstecki et al.
2007/0092914 A1 4/2007 Griffiths et al.
2007/0172426 A1 7/2007 Lee et al.
2007/0172873 A1 7/2007 Brenner et al.
2007/0195127 A1 8/2007 Ahn et al.
2007/0228588 A1 10/2007 Noritomi et al.
2007/0264320 A1 11/2007 Lee et al.
2008/0003142 A1 1/2008 Link et al.
2008/0004436 A1 1/2008 Tawfik et al.
2008/0014589 A1 1/2008 Link et al.
2009/0012187 A1 1/2009 Chu et al.
2009/0035770 A1 2/2009 Mathies et al.
2009/0068170 A1 3/2009 Weitz et al.
2009/0131543 A1 5/2009 Weitz et al.
2009/0197772 A1 8/2009 Griffiths et al.
2009/0197977 A1 8/2009 Haeberle et al.
2009/0286687 A1 11/2009 Dressman et al.
2010/0022414 A1 1/2010 Link et al.
2010/0055677 A1 3/2010 Colston, Jr. et al.
2010/0075436 A1 3/2010 Urdea et al.
2010/0130369 A1 5/2010 Shenderov et al.
2010/0136544 A1 6/2010 Agresti et al.
2010/0137163 A1 6/2010 Link et al.
2010/0173394 A1 7/2010 Colston, Jr. et al.
2010/0210479 A1 8/2010 Griffiths et al.
2011/0059556 A1 3/2011 Strey et al.
2011/0086780 A1 4/2011 Colston et al.
2011/0092392 A1 4/2011 Colston et al.
2011/0160078 A1 6/2011 Fodor et al.
2011/0218123 A1 9/2011 Weitz et al.
2011/0267457 A1 11/2011 Weitz et al.
2012/0010107 A1 1/2012 Griffiths et al.
2012/0015382 A1 1/2012 Weitz et al.
2012/0015822 A1 1/2012 Weitz et al.
2012/0190032 A1 7/2012 Ness et al.
2012/0220494 A1 8/2012 Samuels et al.

(56) References Cited

U.S. PATENT DOCUMENTS

| | | | |
|---|---|---|---|
| 2012/0220497 A1 | 8/2012 | Jacobson et al. |
| 2012/0222748 A1 | 9/2012 | Weitz et al. |
| 2013/0079231 A1 | 3/2013 | Pushkarev et al. |
| 2013/0109575 A1 | 5/2013 | Kleinschmidt et al. |
| 2013/0157899 A1 | 6/2013 | Adler et al. |
| 2013/0210639 A1 | 8/2013 | Link et al. |
| 2013/0274117 A1 | 10/2013 | Church et al. |
| 2014/0155295 A1 | 6/2014 | Hindson et al. |
| 2014/0199730 A1 | 7/2014 | Agresti et al. |
| 2014/0199731 A1 | 7/2014 | Agresti et al. |
| 2014/0227684 A1 | 8/2014 | Hindson et al. |
| 2014/0235506 A1 | 8/2014 | Hindson et al. |
| 2014/0303039 A1 | 10/2014 | Weitz et al. |
| 2014/0378349 A1 | 12/2014 | Hindson et al. |
| 2015/0005200 A1 | 1/2015 | Hindson et al. |
| 2015/0314292 A1 | 11/2015 | Weitz et al. |
| 2018/0056293 A1 | 3/2018 | Weitz et al. |

FOREIGN PATENT DOCUMENTS

| | | |
|---|---|---|
| EP | 1 482 036 B1 | 10/2007 |
| EP | 1 594 980 B1 | 11/2009 |
| EP | 1 967 592 B1 | 4/2010 |
| EP | 2 258 846 A2 | 12/2010 |
| EP | 2 145 955 B1 | 2/2012 |
| EP | 1 905 828 B1 | 8/2012 |
| EP | 1 908 832 B1 | 12/2012 |
| EP | 2 540 389 A1 | 1/2013 |
| JP | S59-049832 A2 | 3/1984 |
| JP | 2004-361291 A | 12/2004 |
| JP | 2006-507921 A | 3/2006 |
| JP | 2006-289250 A | 10/2006 |
| JP | 2007-268350 A | 10/2007 |
| JP | 2007-298327 A | 11/2007 |
| JP | 2009-208074 A2 | 9/2009 |
| WO | WO 96/29629 A2 | 9/1996 |
| WO | WO 96/41011 A1 | 12/1996 |
| WO | WO 99/09217 A1 | 2/1999 |
| WO | WO 99/52708 A1 | 10/1999 |
| WO | WO 00/08212 A1 | 2/2000 |
| WO | WO 00/26412 A1 | 5/2000 |
| WO | WO 01/14589 A2 | 3/2001 |
| WO | WO 01/89787 A2 | 11/2001 |
| WO | WO 02/31203 A2 | 4/2002 |
| WO | WO 02/086148 A1 | 10/2002 |
| WO | WO 2004/002627 A2 | 1/2004 |
| WO | WO 2004/091763 A2 | 10/2004 |
| WO | WO 2004/102204 A1 | 11/2004 |
| WO | WO 2004/103565 A2 | 12/2004 |
| WO | WO 2005/021151 A1 | 3/2005 |
| WO | WO 2005/040406 A1 | 5/2005 |
| WO | WO 2005/049787 A2 | 6/2005 |
| WO | WO 2005/082098 A2 | 9/2005 |
| WO | WO 2006/078841 A1 | 7/2006 |
| WO | WO 2006/096571 A2 | 9/2006 |
| WO | WO 2007/001448 A2 | 1/2007 |
| WO | WO 2007/002490 A2 | 1/2007 |
| WO | WO 2007/024840 A2 | 3/2007 |
| WO | WO 2007/081385 A2 | 7/2007 |
| WO | WO 2007/081387 A1 | 7/2007 |
| WO | WO 2007/089541 A2 | 8/2007 |
| WO | WO 2007/114794 A1 | 10/2007 |
| WO | WO 2007/121489 A2 | 10/2007 |
| WO | WO 2007/133710 A2 | 11/2007 |
| WO | WO 2007/134120 A2 | 11/2007 |
| WO | WO 2007/138178 A2 | 12/2007 |
| WO | WO 2007/139766 A2 | 12/2007 |
| WO | WO 2007/140015 A2 | 12/2007 |
| WO | WO 2007/149432 A2 | 12/2007 |
| WO | WO 2008/017031 A2 | 2/2008 |
| WO | WO 2008/021123 A1 | 2/2008 |
| WO | WO 2008/091792 A2 | 7/2008 |
| WO | WO 2008/102057 A1 | 8/2008 |
| WO | WO 2008/109176 A2 | 9/2008 |
| WO | WO 2008/134153 A1 | 11/2008 |
| WO | WO 2008/148200 A1 | 12/2008 |
| WO | WO 2009/005680 A1 | 1/2009 |
| WO | WO 2009/011808 A1 | 1/2009 |
| WO | WO 2009/085215 A1 | 7/2009 |
| WO | WO 2010/151776 A2 | 12/2010 |
| WO | WO 2011/056546 A1 | 5/2011 |
| WO | WO 2012/048341 A1 | 4/2012 |
| WO | WO 2013/177220 A1 | 11/2013 |

OTHER PUBLICATIONS

Canadian Examination Report mailed Mar. 27, 2017 for Application No. CA2778816.

Canadian Office Action mailed Nov. 28, 2017 for Application No. CA2778816.

Chinese Office Action mailed Dec. 16, 2013 for Application No. CN 201080055990.9.

Chinese Office Action mailed Jul. 30, 2014 for Application No. CN 201080055990.9.

Chinese Office Action mailed Jan. 22, 2015 for Application No. CN 20108005990.9.

Chinese Office Action mailed Jul. 7, 2015 for Application No. CN 201080055990.9.

Office Communication mailed Aug. 4, 2016 for Application No. EP 10776469.8.

European Office Communication mailed Mar. 23, 2017 for Application No. EP10776469.8.

Office Communication mailed Feb. 20, 2018 for Application No. EP 10776469.8.

Extended European Search Report mailed Feb. 12, 2019 for Application No. EP 18205385.0.

European Office Action mailed Apr. 22, 2020 for Application No. EP 18205385.0.

Japanese Office Action mailed Nov. 19, 2013 for Application No. JP 2012-536941.

Japanese Office Action dated Aug. 5, 2014 for Application No. JP 2012-536941.

International Search Report and Written Opinion from PCT Application PCT/US2010/054050 mailed Jan. 31, 2011.

International Preliminary Report on Patentability from PCT Application PCT/US2010/054050 mailed May 10, 2012.

Office Action mailed Sep. 17, 2013 for U.S. Appl. No. 13/503,588.

Office Action mailed Feb. 10, 2014 for U.S. Appl. No. 13/503,588.

Office Action mailed Aug. 5, 2016 for U.S. Appl. No. 15/707,771.

Final Office Action mailed Dec. 5, 2016 for U.S. Appl. No. 15/707,771.

Office Action mailed Jun. 9, 2017 for U.S. Appl. No. 15/707,771.

Office Action mailed Mar. 15, 2019 for U.S. Appl. No. 15/791,068.

Office Action mailed Jun. 4, 2019 for U.S. Appl. No. 15/791,068.

Office Action mailed Dec. 16, 2019 for U.S. Appl. No. 15/791,068.

Office Action mailed Apr. 8, 2020 for U.S. Appl. No. 15/791,068.

Office Action mailed Sep. 14, 2020 for U.S. Appl. No. 15/791,068.

[No Author] Microfluidic ChipShop. Microfluidic product catalogue. Mar. 2005.

[No Author] Microfluidic ChipShop. Microfluidic product catalogue. Oct. 2009.

Abate et al., Droplet Based Sequencing. American Physical Society. Presentation. Mar. 12, 2008. 25 pages.

Abate et al., Valve-based flow focusing for drug formation. Appl Phys Lett. 2009;94. 3 pages. (Month not cited on publication).

Adamson et al. "Production of arrays of chemically distinct nanolitre plugs via repeated splitting in microfluidic devices", Lab on a Chip, 2006;6:1178-1186.

Agresti, "Selection of ribozymes that catalyse multiple-turnover Diels-Alder cycloadditions by using in vitro compartmentalization", PNAS, 102, 16170-16175 (2005). (Nov. 2005).

Akselband, "Enrichment of slow-growing marine microorganisms from mixed cultures using gel microdrop (GMD) growth assay and fluorescence-activated cell sorting", J. Exp. Marine Biol., 329:196-205 (2006). (Month not cited on publication).

Akselband, "Rapid mycobacteria drug susceptibility testing using gel microdrop (GMD) growth assay and flow cytometry", J. Microbiol. Methods, 62:181-197 (2005). (Month not cited on publication).

(56) References Cited

OTHER PUBLICATIONS

Anna et al., Formation of dispersions using 'flow focusing' in microchannels. Appln Phys Letts. 2003;82(3):364-66. (Jan. 2003).
Boone, et al. Plastic advances microfluidic devices. The devices debuted in silicon and glass, but plastic fabrication may make them hugely successful in biotechnology application. Analytical Chemistry. Feb. 2002; 78A-86A.
Braeckmans et al., Scanning the Code. Modern Drug Discovery. 2003:28-32. (Feb. 2003).
Brouillet et al., Modification of the droplet size and distribution of parenteral emulsions by tangential microfiltration. J Membrane Science. 2003;221:199-206.
Carroll, "The selection of high-producing cell lines using flow cytometry and cell sorting", Exp. Op. Biol. Therp., 4:11 1821-1829 (2004). (Month not cited on publication).
Chaudhary "A rapid method of cloning functional variable-region antibody genese in *Escherichia coli* as single-chain immunotoxins" Proc. Natl. Acad. Sci USA 87: 1066-1070 (Feb. 1990).
Chechetkin et al., Sequencing by hybridization with the generic 6-mer oligonucleotide microarray: an advanced scheme for data processing. J Biomol Struct Dyn. Aug. 2000;18(1):83-101. (Month not cited on publication).
Chou, et al. Disposable Microdevices for DNA Analysis and Cell Sorting. Proc. Solid-State Sensor and Actuator Workshop, Hilton Head, SC. Jun. 8-11, 1998; 11-14.
Chu, L., et al., "Controllable Monodisperse Multiple Emulsions," Angew. Chem. Int. Ed., vol. 46, pp. 8970-8974 (2007). (Month not cited on publication).
Clausell-Tormos et al., "Droplet-based microfluidic platforms for the encapsulation and screening of mammalian cells and multicellular organisms", Chem. Biol. 15:427-437 (2008). (May 2008).
De Bruin et al., UBS Investment Research. Q-Series®: DNA Sequencing. UBS Securities LLC. Jul. 12, 2007. 15 pages.
Diaz, R.V., et al., "One-Month sustained release microspheres of 125 I-bovine calcitonin In vitro-in vivo studies, " Journal of Controlled Release, vol. 59, pp. 55-62 (1999). (Month not cited on publication).
Doerr, The smallest bioreactor. Nature Methods. 2005; 2(5):326. (May 2005).
Drmanac et al., Sequencing by hybridization (SBH): advantages, achievements, and opportunities. Adv Biochem Eng Biotechnol. 2002;77:75-101. (Month not cited on publication).
Fu, "A microfabricated fluorescence-activated cell sorter", Nature Biotech., 17:1109-1111 (1999). (Nov. 1999).
Fulton et al., Advanced multiplexed analysis with the FlowMetrix system. Clin Chem. Sep. 1997;43(9):1749-56.
Gartner, et al. The Microfluidic Toolbox—examples for fluidic interfaces and standardization concepts. Proc. SPIE 4982, Microfluidics, BioMEMS, and Medical Microsystems, (Jan. 17, 2003); doi: 10.1117/12.479566.
Ghadessy et al. Directed evolution of polymerase function by compartmentalized self-replication. Proc Natl Acad Sci USA. Apr. 10, 2001; 98(8):4552-7. Epub Mar. 27, 2001.
He et al., "Selective Encapsulation of Single Cells and Subcellular Organelles into Picoliter- and Femtoliter-Volume Droplets" Anal. Chem 77: 1539-1544 (2005) (Mar. 2005).
Holtze et al., Biocompatible surfactants for water-in-fluorocarbon emulsions. Lab Chip. Oct. 2008; 8(10):1632-9.
Huebner, "Quantitative detection of protein expression in single cells using droplet microfluidics", Chem. Commun. 1218-1220 (2007). (Month not cited on publication).
Hug et al. Measurement of the No. of molecules of a single mRNA species in a complex mRNA preparation. J Theor Biol. Apr. 21, 2003; 221(4):615-24.
Khomiakova et al., [Analysis of perfect and mismatched DNA duplexes by a generic hexanucleotide microchip]. Mol Biol (Mosk). Jul.-Aug. 2003;37(4):726-41. Russian.
Kim et al., Fabrication of monodisperse gel shells and functional microgels in microfluidic devices. Angew Chem Int Ed Engl. Mar. 2007;46(11):1819-22.
Kim, "Fabrication of monodisperse gel shells and functional microgels in microfluidic devices", Angew. Chem., 119:1851-1854 (2007).
Kim, J., et al, "Albumin loaded microsphere of amphiphilic poly-(ethylene glycol)/poly(a-ester) multiblock copolymer," European Journal of Pharmaceutical Sciences, vol. 23, pp. 245-251 (2004). (Month not cited on publication).
Koster et al., "Drop-based microfluidic devices for encapsulation of single cells", Lab on a Chip The Royal Soc. of Chem. 8:1110-1115 (2008). (Month not cited on publication).
Li, Y., et al., "PEGylated PLGA nanoparticles as protein carriers: synthesis, preparation and biodistribution in rats," Journal of Controlled Release, vol. 71, pp. 203-211 (2001). (Month not cited on publication).
Loscertales, Micro/Nano encapsulation via electrified coaxial liquid jets. Science. 2002;295:1695-98. (Mar. 2002).
Love, A microengraving method for rapid selection of single cells producing antigen-specific antibodies. Nature Biotech. Jun. 2006:24(6):703-07.
Mazutis et al., Selective droplet coalescence using microfluidic systems. Lab Chip. Apr. 24, 2012;12(10):1800-6.
Mirzabekov, "Dna Sequencing by Hybridization—a Megasequencing Method and a Diagnostic Tool?" Trends in Biotechnology 12(1): 27-32 (1994) (Jan. 1994).
Mouritzen et al., Single nucleotide polymorphism genotyping using locked nucleic acid (LNA). Expert Rev Mol Diagn. Jan. 2003;3(1):27-38.
Nguyen, "In situ hybridization to chromosomes stabilized in gel microdrops", Cytometry, 21:111-119 (1995). (Month not cited on publication).
Okushima, "Controlled production of monodisperse double emulsions by two-step droplet breakup in microfluidic devices", Langmuir, 20:9905-9908 (2004). (Month not cited on publication).
Perez, C., et al., "Poly(lactic acid)-poly(ethylene glycol) nanoparticles as new carriers for the delivery of plasmid DNA," Journal of Controlled Release, vol. 75, pp. 211-224 (2001). (Month not cited on publication).
Ryan, "Rapid assay for mycobacterial growth and antibiotic susceptibility using gel microdrop and encapsulation", J. Clinical Microbiol., 33:7 1720-1726 (1995). (Jul. 1995).
Schirinzi et al., Combinatorial sequencing-by-hybridization: analysis of the NF1 gene. Genet Test. 2006 Spring;10(1):8-17. (Month not cited on publication).
Schmitt, "Bead-based multiplex genotyping of human papillomaviruses", J. Clinical Microbiol., 44:2 504-512 (2006). (Feb. 2006).
Shah, "Fabrication of monodisperse thermosensitive microgels and gel capsules in microfluidic devices", Soft Matter, 4:2303-2309 (2008). (Month not cited on publication).
Simeonov et al., Single nucleotide polymorphism genotyping using short, fluorescently labeled locked nucleic acid (LNA) probes and fluorescence polarization detection. Nucleic Acids Res. Sep. 1, 2002;30(17):e91.
Sorokin et al., Discrimination between perfect and mismatched duplexes with oligonucleotide gel microchips: role of thermodynamic and kinetic effects during hybridization. J Biomol Struct Dyn. Jun. 2005;22(6):725-34.
Su et al., Microfluidics-Based Biochips: Technology Issues, Implementation Platforms, and Design-Automation Challenges. IEEE Transactions on Computer-Aided Design of Integrated Circuits and Systems. 2006;25(2):211-23. (Feb. 2006).
Sun et al., Progress in research and application of liquid-phase chip technology. Chinese Journal Experimental Surgery. May 2005;22(5):639-40.
Tawfik, et al. Man-made cell-like compartments for molecular evolution. Nat Biotechnol. Jul. 1998;16(7):652-6.
Van De Hulst et al., Glare points. Appl Opt. Nov. 20, 1991;30(33):4755-63.
Wang et al., Single nucleotide polymorphism discrimination assisted by improved base stacking hybridization using oligonucleotide microarrays. Biotechniques. 2003;35:300-08. (Aug. 2003).
Weaver, "Rapid clonal growth measurements at the single-cell level: gel microdroplets and flow cytometry", Biotechnology, 9:873-877 (1991). (Sep. 1991).

(56) References Cited

OTHER PUBLICATIONS

Whitesides, "Soft lithography in biology and biochemistry", Annual Review of Biomedical Engineering, 3:335-373 (2001). (Month not cited on publication).
Xia, "Soft lithography", Annual Review of Material Science, 28:153-184 (1998). (Month not cited on publication).
Zhang, "Combinatorial marking of cells and organelles with reconstituted fluorescent proteins", Cell, 119:137-144 (Oct. 1, 2004).
Zhao, J., et al., "Preparation of hemoglobin-loaded nano-sized particles with porous structure as oxygen carriers," Biomaterials, vol. 28, pp. 1414-1422 (2007). Available online Nov. 2006.
Zimmerman, Microscale production of hybridomas by hypo-osmolar electrofusion. Hum Antibod Hybridomas. 1992;3 (January): 14-18.
Report on the Filing or Determination of an Action Regarding a Patent or Trademark, filed Mar. 8, 2021, in Case 1:20-cv-00506-RGA, U.S. District Court for the District of Delaware, *Bio-Rad Laboratories, Inc., The University of Chicago, Lawrence Livermore National Security LLC, and President and Fellows of Harvard College* v. *Dropworks, Inc*., filed Apr. 14, 2020.
Decision/Judgment on Report on the Filing or Determination of an Action Regarding a Patent or Trademark, issued Oct. 18, 2021, in Case 1:20-cv-00506-RGA, U.S. District Court for the District of Delaware, *Bio-Rad Laboratories, Inc., The University of Chicago, Lawrence Livermore National Security LLC, and President and Fellows of Harvard College* v. *Dropworks, Inc*., filed Apr. 14, 2020.
Extended European Search Report for Application No. EP 21158916.3, mailed May 7, 2021.
European Office Action for Application No. EP 21158916.3, mailed Jan. 13, 2022.
European Office Action for Application No. EP 21158916.3, mailed Feb. 21, 2024.

DROPLET CREATION TECHNIQUES

RELATED APPLICATIONS

This application is a continuation of U.S. patent application Ser. No. 15/791,068, filed Oct. 23, 2017, entitled "Droplet Creation Techniques," which is a continuation of U.S. patent application Ser. No. 14/707,771, filed on May 8, 2015, entitled "Droplet Creation Techniques," which is a continuation of U.S. patent application Ser. No. 13/503,588, with a § 371 (c) date of May 23, 2012, entitled "Droplet Creation Techniques," which is a national stage filing under 35 U.S.C. § 371 of International Patent Application Serial No. PCT/US2010/054050, filed Oct. 26, 2010, entitled "Droplet Creation Techniques," by Weitz, et al., which claims the benefit of U.S. Provisional Patent Application Ser. No. 61/255,239, filed Oct. 27, 2009, entitled "Droplet Creation Techniques," by Weitz, et al., each of which is incorporated herein by reference.

GOVERNMENT FUNDING

This invention was made with government support under 0649865, and 0820484 awarded by the National Science Foundation. The government has certain rights in the invention.

FIELD OF INVENTION

The present invention is generally related to systems and methods for producing droplets. The droplets may contain varying species, e.g., for use as a library.

BACKGROUND

One component of many microfluidic processes is a plurality of monodisperse droplets. To form a plurality of droplets with traditional techniques, a brute force approach is generally used. For example, in some processes, each desired combination of reagents must be emulsified individually using a single microfluidic droplet maker; the products of all emulsifications are then pooled together to create a single emulsion library. This can be a long, tedious, and expensive process for even small libraries. Moreover, because of the sequential, manual emulsification of each element, it can be very difficult to maintain high uniformity in droplet size.

SUMMARY OF THE INVENTION

The present invention is generally related to systems and methods for producing droplets. The droplets may comprise varying species, e.g., for the creation of a library. The subject matter of the present invention involves, in some cases, interrelated products, alternative solutions to a particular problem, and/or a plurality of different uses of one or more systems and/or articles.

In one aspect, the invention is directed to a method. In one embodiment, a method for forming a plurality of droplets comprises providing at least one droplet comprising a first fluid substantially surrounded by a second fluid and passing the at least one droplet through a microfluidic channel to form a plurality of divided droplets.

In another aspect, the invention is directed to an article. In one embodiment, the article comprises a fluid containing a plurality of droplets, at least some of which have distinguishable compositions, and a flow-focusing device able to produce divided droplets using the plurality of droplets contained within the fluid, the produced divided droplets having a distribution of diameters such that no more than about 5% of the droplets have a diameter greater than about 10% of the average diameter of the droplets.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

The present invention is generally related to systems and methods for producing droplets. The droplets may contain varying species, e.g., for use as a library. In some cases, at least one droplet is used to create a plurality of droplets, using techniques such as flow-focusing techniques. In one set of embodiments, a plurality of droplets, containing varying species, can be divided to form a collection of droplets containing the various species therein. A collection of droplets, according to certain embodiments, may contain various subpopulations of droplets that all contain the same species therein. Such a collection of droplets may be used as a library in some cases, or may be used for other purposes.

In one aspect, the present invention provides techniques for forming a plurality of droplets. At least some of the droplets may comprise at least one species therein, such as a nucleic acid probe or a cell. In one set of embodiments, at least one droplet comprising a first fluid substantially surrounded by a second fluid is provided. In some cases, the first fluid and the second fluid are substantially immiscible. For instance, a droplet may contain an aqueous-based liquid, and be substantially surrounded by an oil-based liquid; other configurations are discussed in detail below. The droplet may be divided into a plurality of droplets, for example, by passing the droplet through a microfluidic channel and using flow-focusing or other techniques to cause the droplet to form a plurality of smaller droplets, as discussed below. This may be repeated for a plurality of incoming droplets, and in some cases, some or all of the droplets may contain various species. In certain instances, the droplets so produced may be collected together, e.g., forming an emulsion. If different droplets containing various species are used, the resulting collection may comprise a plurality of groups of droplets, where the droplets within each group are substantially indistinguishable, but each group of droplets is distinguishable from the other groups of droplets, e.g., due to different species contained within each group of droplets. In some cases, such collections may be used to create libraries of droplets containing various species.

Figure 1:
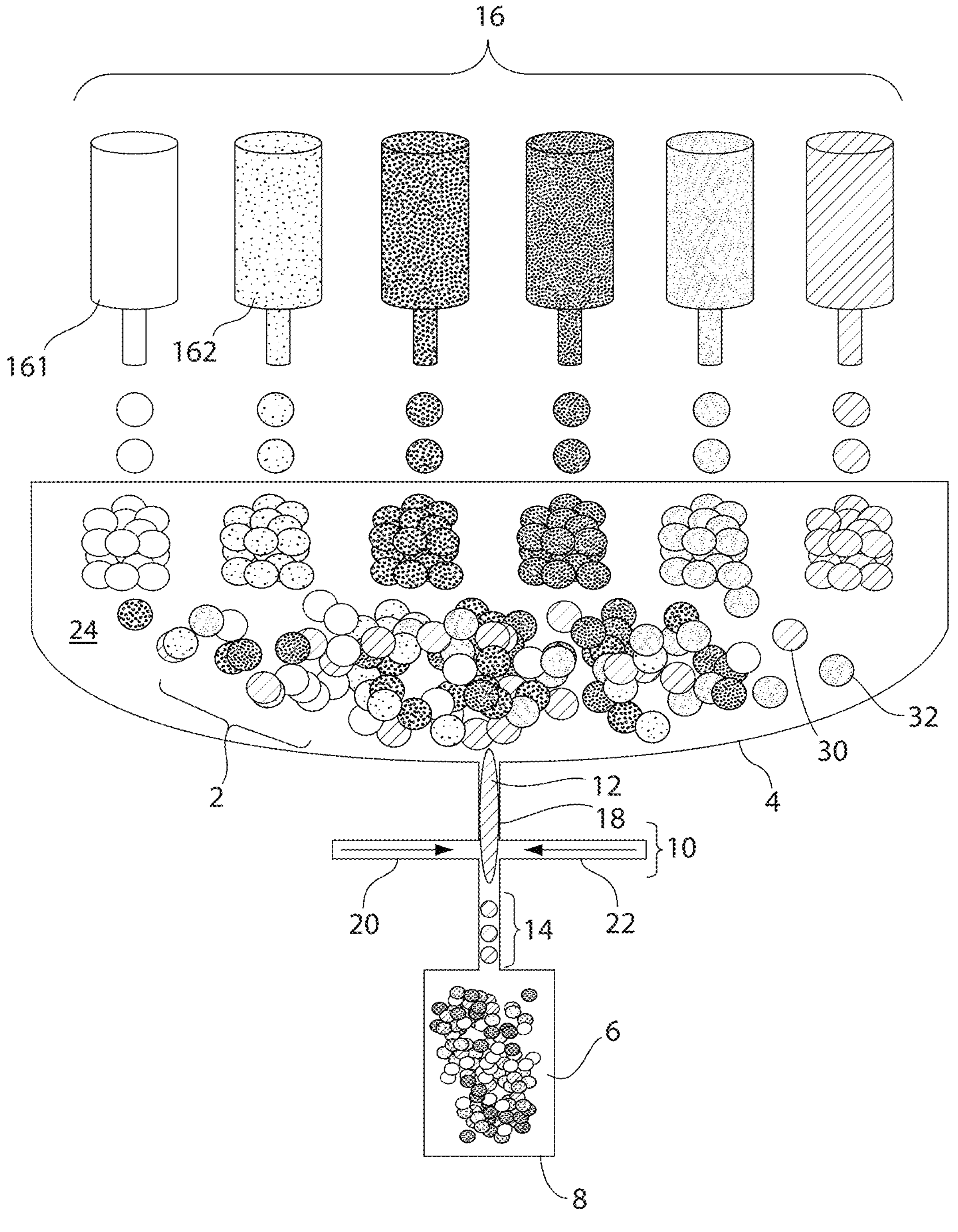
FIG. 1 shows the formation of a collection of droplets, according to a non-limiting embodiment of the invention.

A non-limiting example of an embodiment directed to forming an emulsion comprising a plurality of groups of substantially indistinguishable droplets is shown in FIG. 1. In this figure, six distinguishable fluids (e.g., fluids containing six distinguishable species) are provided, each fluid contained in one of containers 16. (Six such fluids and containers are provided here by way of example only; other numbers of containers or fluids can be used in other embodiments of the invention, as discussed below.) The fluids may be distinguishable, for example, as having different compositions, and/or the same compositions but different species contained within the fluids, and/or the same species but at different concentrations. For instance, container 161 may include a first fluid and a first species contained therein, while container 162 may include the first fluid and a second species contained therein, or container 162 may include a second fluid containing the first species or a different species, or container 162 may include the first fluid and the first species, but at a different concentration than container 161, etc. The containers may be filled using any suitable technique, e.g., automated techniques such as automated pipetting techniques, robots, etc., or the fluids may be added manually to the containers 16, or any suitable combination of approaches.

The fluids within containers 16 may then be poured into common container 4 filled with a carrying fluid 24 that is not substantially miscible with the fluids from containers 16. The fluids from containers 16 may be added in any suitable order to common container 4, e.g., sequentially, simultaneously, etc. Thus, common container 4, in this example, contains a plurality of droplets, containing fluids from the various containers 16. In some cases, the droplets within common container 4 may form an emulsion. It should be noted, that although emulsion 2 was formed in this example through the addition of fluids to a common container 4, in some embodiments, as discussed below, other methods may be used to form emulsion 2.

Still referring to the illustrative example shown in FIG. 1, a droplet 12 from common container 4 then passes through channel 18, and a plurality of droplets 14 is formed from droplet 12 using droplet maker 10. Examples of such droplet makers are described in detail below. As shown in FIG. 1, droplet maker 10 includes channels 20 and 22 which each intersect channel 18. Channels 20 and 22 each contain an outer fluid. The flow of outer fluid 10 around the fluid within channel 18 causes the fluid to divide to form a plurality of droplets 14. However, droplet maker 10 is presented here by way of example only; in other embodiments of the invention, other droplet maker configurations, involving different channels, etc. can be used. In some instances, droplets 14 may be substantially monodisperse, or otherwise have a narrow range of average diameters or volumes. Droplets 14 then flow to collection chamber 8.

This can then be repeated using other droplets within collection chamber 4. For example, a first droplet 30 may be divided to form a first plurality of divided droplets and a second droplet 32 may be divided to form a second plurality of divided droplets. Each of the droplets within each of the pluralities of divided droplets may be substantially indistinguishable, although the droplets from the different pluralities may be distinguishable from each other. The droplets after division may all be collected within collection chamber 8, optionally mixed, to form collection of droplets 6 (e.g., an emulsion), as is shown in FIG. 1. In some cases, the collection of droplets 6 may define a library of species, each contained within a plurality of droplets, and the collection of droplets 6 may be used for analysis of a nucleic acid, a cell, etc.

As mentioned above, the groups of droplets prior to division (and/or a first plurality of divided droplets and a second plurality of divided droplets) may be distinguished in some fashion, e.g., on the basis of composition and/or concentration of the species contained within the droplets and/or the fluids forming the droplets. For example, a first droplet may comprise of a first fluid and contain a first species, and a second droplet may comprise the same first fluid and contain a second species, where the first species and the second species are distinguishable with respect to each other, or the second droplet may also contain the first species, but at a concentration substantially different than the first droplet, etc. Non-limiting examples of species that can be incorporated within droplets of the invention include, but are not limited to, nucleic acids (e.g., siRNA, RNAi, DNA, etc.), proteins, peptides, enzymes, nanoparticles, quantum dots, fragrances, proteins, indicators, dyes, fluorescent species, chemicals, cells, particles, pharmaceutical agents, drugs, precursor species for hardening as is discussed below, or the like. A species may or may not be substantially soluble in the fluid contain in the droplet and/or the fluid substantially surrounding the droplet.

In some cases, a first droplet and a second droplet (e.g., a first divided droplet and a second divided droplet formed from a droplet and/or a first droplet and second droplet prior to division) may have substantially the same composition. As used herein, “substantially the same composition” refers to at least two droplets which have essentially the same composition (e.g., fluid, polymer, gel, etc.) at the same concentrations, including any species contained within the droplets, e.g., the droplets may have substantially indistinguishable compositions and/or concentrations of species. The droplets may have the same or different diameters. In some cases, two droplets which have substantially the same composition may differ in their composition by no more than about 0.5%, no more than about 1%, no more than about 2%, no more than about 3%, no more than about 4%, no more than about 5%, no more than about 10%, no more than about 20%, and the like, relative to the average compositions of the droplets.

In some cases, a droplet may comprise more than one type of species. For example, a droplet may comprise at least about 2 types, at least about 3 types, at least about 4 types, at least about 5 types, at least about 6 types, at least about 8 types, at least about 10 types, at least about 15 types, at least about 20 types, or the like, of species. The total number of species of each type contained within a droplet may or may not necessarily be equal. For instance, in some cases, when two types of species are contained within a droplet, there may be approximately an equal number of the first type of species and the second type of species contained within the droplet. In other cases, the first type of species may be present in a greater or lesser amount than the second type of species, for example, the ratio of one species to another species may be about 1:2, about 1:3, about 1:4, about 1:5, about 1:6, about 1:10, about 1:20, about 1:100, and the like. The number of each type of species in each of a group of droplets may or may not be equal. For example, a first droplet of a group may comprise one of a first type of species and one of a second type of species and a second droplet of the group may contain more than one of the first type of species and one or more of the second type of species. In some cases, the droplets may be formed such that the plurality of droplets contains at least four distinguishable species, such that no more than about 1%, about 2%, about 3%, about 5%, about 10%, etc., of the droplets contains two or more of the at least four distinguishable species therein. The distinguishable species may be a four distinguishable nucleic acids, identification elements, or proteins, as described herein. In some cases, a droplet may comprise more than one member of a type of species. For example, a droplet may comprise at least about 2, at least about 3, at least about 5, at least about 10, at least about 20, at least about 50, at least about 100, or the like, members of a single species.

A collection of droplets may comprise, in some embodiments, at least about 2, at least about 4, at least about 10, at least about 30, at least about 50, at least about 64, at least about 128, at least about 1024, at least about 4096, at least about 10,000, or more, groups of distinguishable droplets, where each group of droplets contains one or more indistinguishable droplets. The number of droplets in each group may or may not be approximately equal.

The droplets (e.g., prior to or after division) may be polydisperse, monodisperse, or substantially monodisperse (e.g., having a homogenous distribution of diameters). A plurality of droplets is substantially monodisperse in instances where the droplets have a distribution of diameters such that no more than about 10%, about 5%, about 4%, about 3%, about 2%, about 1%, or less, of the droplets have a diameter greater than or less than about 20%, about 30%, about 50%, about 75%, about 80%, about 90%, about 95%, about 99%, or more, of the average diameter of all of the droplets. The "average diameter" of a population of droplets, as used herein, is the arithmetic average of the diameters of the droplets. Those of ordinary skill in the art will be able to determine the average diameter of a population of droplets, for example, using laser light scattering or other known techniques. In some embodiments, the plurality of droplets after division is substantially monodisperse or monodisperse while the droplets prior to division are polydisperse. Without wishing to be bound by theory, one advantage of the techniques of certain embodiments of the present invention is that a substantially monodisperse collection of droplets after division may be formed from an plurality of droplets which are polydisperse. In some cases, the greater the number of droplets formed from a droplet after division, the greater the probability that all of the droplets after division will be substantially monodisperse, even in instances where the droplets are polydisperse.

Those of ordinary skill in the art will be able to determine the appropriate size for a droplet, depending upon factors such as the desired diameter and/or number of the divided droplets to be formed from the droplet, etc., depending on the application. In some case, a droplet prior to division has an average diameter greater than about 500 micrometers, greater than about 750 micrometers, greater than about 1 millimeter, greater than about 1.5 millimeter, greater than about 2 millimeter, greater than about 3 millimeter, greater than about 5 millimeter, or greater, and the plurality of divided droplets have an average diameter of less than about 1000 micrometers, less than about 750 micrometers, less than about 500 micrometers, less than about 400 micrometers, less than about 300 micrometers, less than about 200 micrometers, less than about 100 micrometers, less than about 50 micrometers, less than about 25 micrometers, less than about 10 micrometers, or less. In some instances, at least about 5, at least about 10, at least about 20, at least about 25, at least about 50, at least about 75, at least about 100, or more, divided droplets are produced from a droplet. In some cases, between about 5 and about 100, between about 10 and about 100, between about 10 and about 50, between about 50 and about 100, or the like, droplets are formed by dividing a single droplet.

A plurality of droplets (e.g., prior to division) may be formed using any suitable technique. For example, the droplets may be formed by shaking or stirring a liquid to form individual droplets, creating a suspension or an emulsion containing individual droplets, or forming the droplets through pipetting techniques, needles, or the like. Other non-limiting examples of the creation of droplets are disclosed in U.S. patent application Ser. No. 11/024,228, filed Dec. 28, 2004, entitled "Method and Apparatus for Fluid Dispersion," by Stone, et al., published as U.S. Patent Application Publication No. 2005/0172476 on Aug. 11, 2005; U.S. patent application Ser. No. 11/246,911, filed Oct. 7, 2005, entitled "Formation and Control of Fluidic Species," by Link, et al., published as U.S. Patent Application Publication No. 2006/0163385 on Jul. 27, 2006; or U.S. patent application Ser. No. 11/360,845, filed Feb. 23, 2006, entitled "Electronic Control of Fluidic Species," by Link, et al., published as U.S. Patent Application Publication No. 2007/0003442 on Jan. 4, 2007, International patent Application No. PCT/US2008/007941, filed Jun. 26, 2008, entitled "Methods and Apparatus for Manipulation of Fluidic Species," published as WO 2009/005680 on Jan. 8, 2009, each incorporated herein by reference.

As mentioned above, in some cases, a plurality of divided droplets may be formed from a droplet by passing the droplet through a microfluidic channel associated with a droplet maker. In some embodiments, a plurality of droplets may be provided in a reservoir, wherein the reservoir has an inlet to the microfluidic channel, or is otherwise in fluidic communication with the microfluidic channel. A droplet comprising a first fluid and be substantially surrounded by a carrying fluid may enter the microfluidic channel. In instances where in the droplet is sufficiently larger in diameter than the microfluidic channel, the droplet may be compressed, e.g., to form a stream of liquid in the microfluidic channel. A plurality of droplets may be formed from the entering fluid (e.g., as a stream of fluid) in the microfluidic channel by the droplet maker. This may be a similar process as in systems where the fluid entering a droplet maker is essentially continuous. Thus, a first plurality of droplets may be formed from the first droplet (e.g., present within the microfluidic channel as a stream of fluid). A second droplet may then enter the microfluidic channel and the process may be repeated, thereby forming a second plurality of droplets from the second droplet, and the second plurality may be distinguishable from the first plurality of droplets. This may be repeated with any number of droplets, which droplets may be distinguishable or indistinguishable from other droplets.

In some cases, the formation of the divided droplets may be parallelized. For example, one or more reservoirs comprising the plurality of droplets may be associated with more than one microfluidic channel comprising a droplet maker, thereby allowing the formation of divided droplets from more than one droplet at a time. In some cases, a reservoir may be each associated with 1, 2, 3, 4, 5, 10, 20, or more microfluidic channels and/or droplet makers. One example of such a system is disclosed in U.S. Provisional Patent Application Ser. No. 61/160,184, filed Mar. 13, 2009, entitled “Scale-up of Microfluidic Devices,” by M. Romanowsky, et al., incorporated herein by reference.

Those of ordinary skill in the art will be aware of other suitable systems and methods for forming droplets from a stream of fluid (e.g., from a droplet) in a microfluidic channel. For example, in one set of embodiments, droplets of fluid can be created from a fluid surrounded by a carrying fluid within a channel by altering the channel dimensions in a manner that is able to induce the fluid to form individual droplets. The channel may, for example, be a channel that expands relative to the direction of flow, e.g., such that the fluid does not adhere to the channel walls and forms individual droplets instead, or a channel that narrows relative to the direction of flow, e.g., such that the fluid is forced to coalesce into individual droplets. In other embodiments, internal obstructions may also be used to cause droplet formation to occur. For instance, baffles, ridges, posts, or the like may be used to disrupt carrying fluid flow in a manner that causes the fluid to coalesce into fluidic droplets. Other droplet makers which may be used in conjunction with a microfluidic system will be known to those of ordinary skill in the art and include, but are not limited to, a T-junction droplet maker, a micro-capillary droplet maker (e.g., co-flow or flow-focus), a three-dimensional droplet maker, etc.

In some cases, a plurality of droplets may be formed using emulsification systems, for example, homogenization, membrane emulsification, shear cell emulsification, fluidic emulsification, etc., including, but not limiting to, milli-, micro-, and nanofluidic systems. That is, a plurality of droplets may be divided using devices and/or techniques other than microfluidics. Those of ordinary skill in the art will be familiar with such systems.

Figure 8:
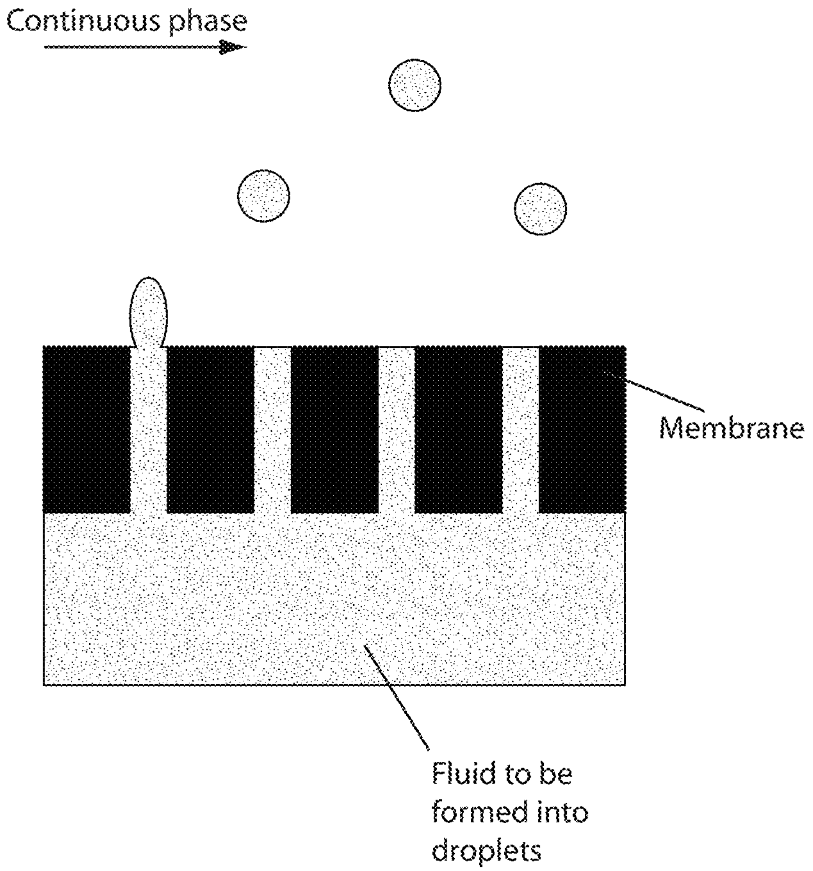
FIG. 8 shows a non-limiting example of membrane emulsification.

In some cases, a plurality of droplets may be divided using membrane emulsification. Membrane emulsification will be known to those of ordinary skill in the art and generally comprises passing a first fluid which is to be formed into an emulsion through a membrane (e.g., comprising a plurality of pores). A substantially non-miscible second fluid is flown past the outer surface (e.g., the surface which the first fluid exits the membrane) of the membrane plate, thereby forming a plurality of droplets comprising the first fluid (e.g., droplets are detached by the continuous phase flowing past the membrane surface), as depicted in FIG. 8. Generally, the flow of the first fluid is controlled by pressure. In embodiments where membrane emulsification is used in conjunction with the present invention, a fluid comprising a plurality of droplets may be passed through the membrane. Each of the droplets is then divided into a plurality of smaller droplets by the flow of a continuous phase past the outer surface of the membrane.

In another set of embodiments, electric charge may be created on a fluid surrounded by a carrying fluid, which may cause the fluid to separate into individual droplets within the carrying fluid. Thus, the fluid can be present as a series of individual charged and/or electrically inducible droplets within the carrying fluid. Electric charge may be created in the fluid within the carrying fluid using any suitable technique, for example, by placing the fluid within an electric field (which may be AC, DC, etc.), and/or causing a reaction to occur that causes the fluid to have an electric charge, for example, a chemical reaction, an ionic reaction, a photocatalyzed reaction, etc.

The electric field, in some embodiments, is generated from an electric field generator, i.e., a device or system able to create an electric field that can be applied to the fluid. The electric field generator may produce an AC field, a DC field (i.e., one that is constant with respect to time), a pulsed field, etc. The electric field generator may be constructed and arranged to create an electric field within a fluid contained within a channel or a microfluidic channel. The electric field generator may be integral to or separate from the fluidic system containing the channel or microfluidic channel, according to some embodiments. As used herein, “integral” means that portions of the components integral to each other are joined in such a way that the components cannot be manually separated from each other without cutting or breaking at least one of the components.

Techniques for producing a suitable electric field (which may be AC, DC, etc.) will be known to those of ordinary skill in the art. For example, in one embodiment, an electric field is produced by applying voltage across a pair of electrodes, which may be positioned on or embedded within the fluidic system (for example, within a substrate defining the channel), and/or positioned proximate the fluid such that at least a portion of the electric field interacts with the fluid. The electrodes can be fashioned from any suitable electrode material or materials known to those of ordinary skill in the art, including, but not limited to, silver, gold, copper, carbon, platinum, copper, tungsten, tin, cadmium, nickel, indium tin oxide (“ITO”), etc., as well as combinations thereof. In some cases, transparent or substantially transparent electrodes can be used.

In some embodiments, a microfluidic device may comprise one or more filters which aid in removing at least a portion of any unwanted particulates from a fluid contained within the device, for example from a droplet contained within a microfluidic channel prior to division to form a plurality of droplet, as discussed herein. Removal of particulate matter (e.g., dust, particles, dirt, debris, cell remnants, protein aggregates, liposomes, colloidal particles, insoluble materials, other unidentified particulates, etc.) may be important because a microfluidic device may include relatively narrow channels and the particulate matter may clog or block a channel. The particulates may be larger than the channel, and/or have a shape such that transport of the particulates through the channel is at least somewhat impeded. For example, the particulates may have a nonuniform or nonspherical shape, comprise portions that can “snag” or rub onto the sides of channels, have a shape that at least partially impedes fluid flow around the particulates, etc. In some cases, multiple particulates may together cause at least some impeding of flow within the channel; for example, the particles may aggregate together within the channel to impede fluid flow.

Figure 6A:
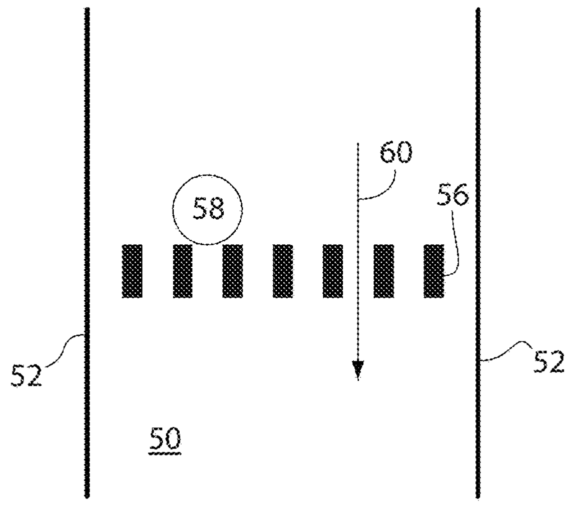
FIGS. 6A-6C show non-limiting examples of microfluidic filters.

Generally, according to one aspect of the present invention, a microfluidic filter comprises a plurality of posts. In some embodiments, the posts may be arranged in a channel; the posts may filter out any unwanted particulate while allowing fluid to flow around the posts. For example, as shown in FIG. 6A, microfluidic channel 50 comprises a plurality of posts 56 positioned between walls 52 of the microfluidic channel. Particulate 58 is trapped by posts 56, while fluid is able to flow between the remaining gaps, as indicated by arrow 60. (Optionally, the fluid may contain droplets, such as those described herein.) The fluid may then enter a droplet maker, and/or otherwise be used within a microfluidic device.

In some aspects, a filter such as that described in FIG. 6A may be used to filter particulate matter from a fluid containing droplets (not shown in FIG. 6A). For instance, the droplets may pass between the posts while particulates such as 58 may become lodged within the filter and be prevented from passing therethrough. It should be noted that even if some particulates are present, such as particulate 58 in FIG. 6A, the filter may still be effective at passing fluid therethrough and filtering additional particulates as long as some passages exist through the filter for fluid to flow, e.g., as identified by arrow 60 in FIG. 6A.

However, in some embodiments, a filter as described in FIG. 6A that is used to filter a fluid containing droplets may cause a larger droplet to split into a plurality of smaller when the droplet passes through the filter. In some cases, the smaller droplets may be polydisperse. For example, the droplets may be deformed or caused to break in various ways as the droplets pass between posts 54.

Figure 6B:
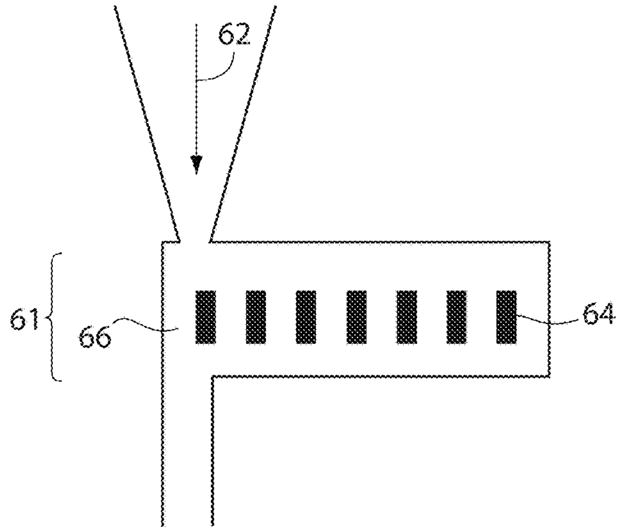

Another embodiment of the invention is shown with reference to FIG. 6B. In this embodiment, channel 62 includes filter 61, comprising a plurality of posts 64. The filter and the posts, in this embodiment, may not be symmetrically arranged about channel 62; instead, in this embodiment, the filter may be arranged such that the posts are substantially positioned on one side of the channel. Thus, for example, at least 50%, at least 70%, or at least 90% of the posts may be positioned on one side of the channel, relative to the other side of the channel. In some embodiments, such as that shown in FIG. 6A, the channel may widen around the filter to accommodate the posts; however, in certain arrangements where the posts are substantially positioned on one side of the channel, the channel may widen in an asymmetric fashion, i.e., the channel widens more on one side of the channel relative to the other side of the channel. It should also be noted that the outlet from the filter is positioned substantially collinearly to the inlet to the filter; however, in other embodiments, the outlet may be positioned in the center or on the other side of the filter, and/or the outlet may be in a direction that is not in the same direction as the inlet. The shape of the filter may be any suitable shape, including, but not limited to, square, triangular, rectangular, circular, etc. Non-limiting examples of filter shapes and configurations are shown in FIGS. 7A-7H.

In some embodiments, a filter comprises a plurality of posts and a plurality of gaps between the posts, where each gap has a different path length from the inlet to the outlet of the filter. Thus, without wishing to be bound by any theory, it is believed that the fluid that flows between each gap has a different hydrodynamic resistance, relative to other paths passing between the gaps from the inlet to the outlet of the filter. The result of such an arrangement may cause the fluid to flow primarily through the gap which has the lowest hydrodynamic ratio. If a particulate enters the filter, it is caught in this gap, and the fluid flow will be diverted around to the next gap which becomes the next available path of least resistance of fluid flow. Surprisingly, such an arrangement may allow particulate matter to be removed while also keeping fluidic droplets within the channel intact, and such an arrangement would not have been predicted or expected by simply providing a series of posts within a channel.

Figure 3A:
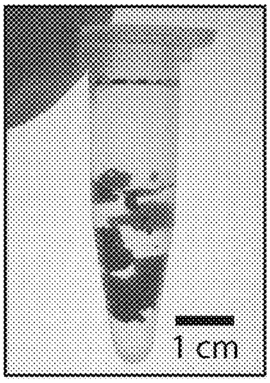
FIG. 3A shows an image of a collection of large polydisperse droplets comprising two groups of substantially indistinguishable droplets, according to yet another embodiment of the invention.
Figure 3B:
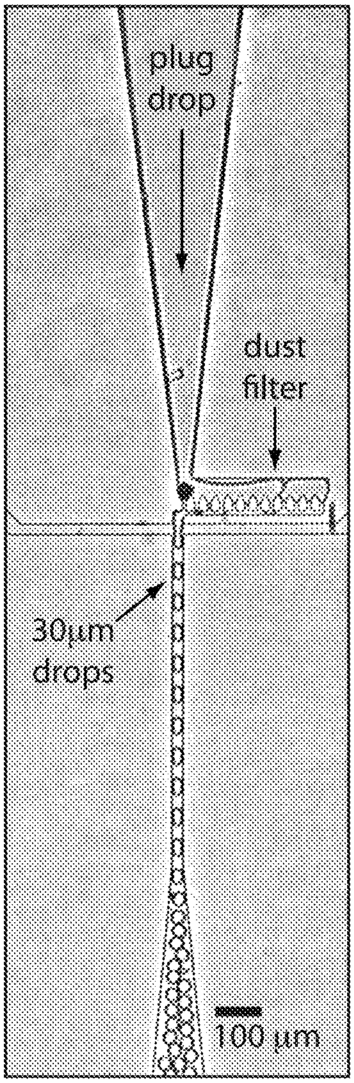
FIG. 3B shows an image of a microfluidic filter, according to a non-limiting embodiment of the invention.
Figure 6C:
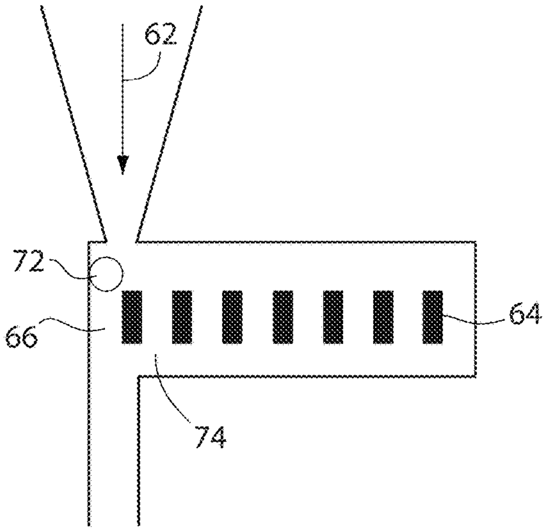

Accordingly, one set of embodiments is generally directed to a filter comprising a plurality of different path lengths between an inlet and an outlet. In some cases, such different path lengths may be created using a plurality of posts and a plurality of gaps between the posts. As mentioned above, the inlet and the outlet for the fluid may be positioned on one side of the filter. For example, as shown in the example of FIG. 6B, fluid 62 flows through filter 61 comprising posts 64. The majority of the fluid flows through gap 66, which has the lowest hydrodynamic resistance. As shown in FIG. 6C, if gap 66 becomes substantially blocked with particulate 72, the majority of the fluid may flow through gap 74, the gap with the next lowest hydrodynamic resistance. An image of an example filter is also shown in FIG. 3B.

Figure 6D:
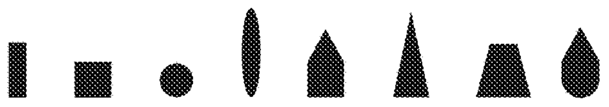
FIG. 6D illustrates non-limiting examples of post shapes which may be present in a microfluidic filter.
Figure 7A:
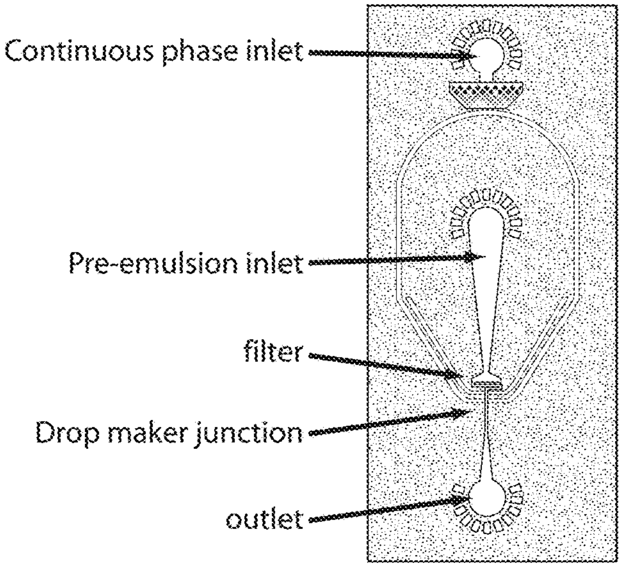
FIGS. 7A-7H illustrate non-limiting examples of microfluidic filters.
Figure 7B:
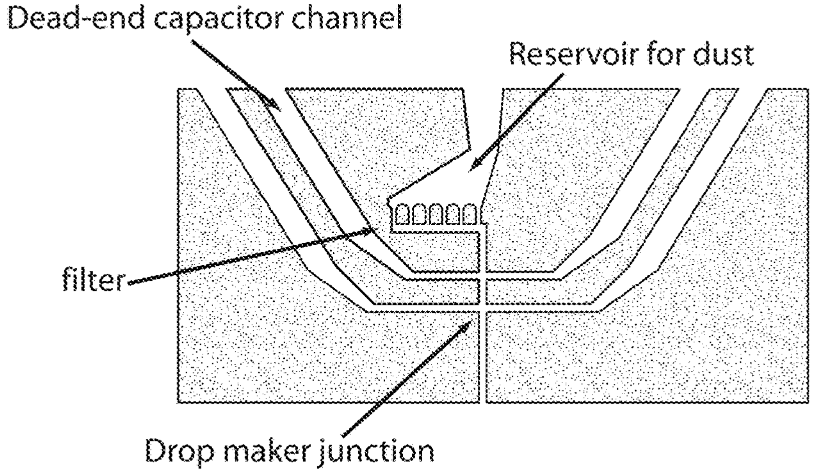
Figure 7C:
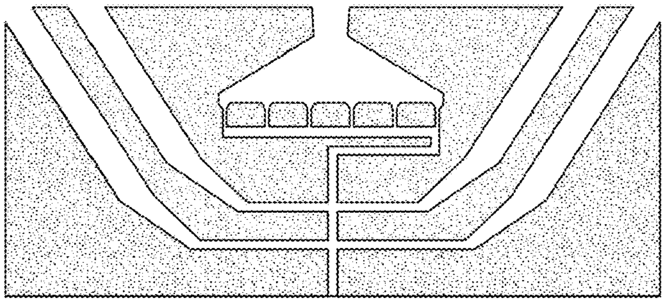
Figure 7D:
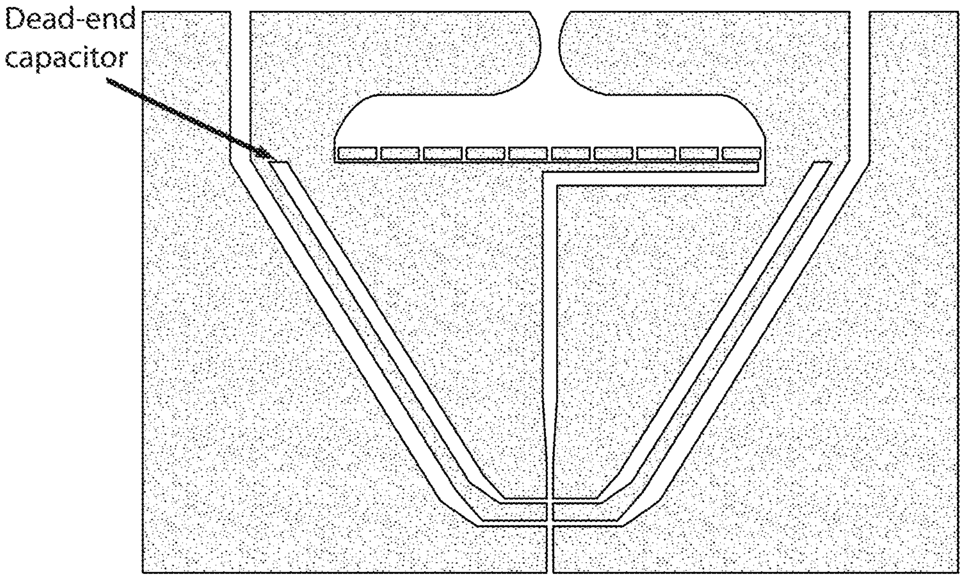
Figure 7E:
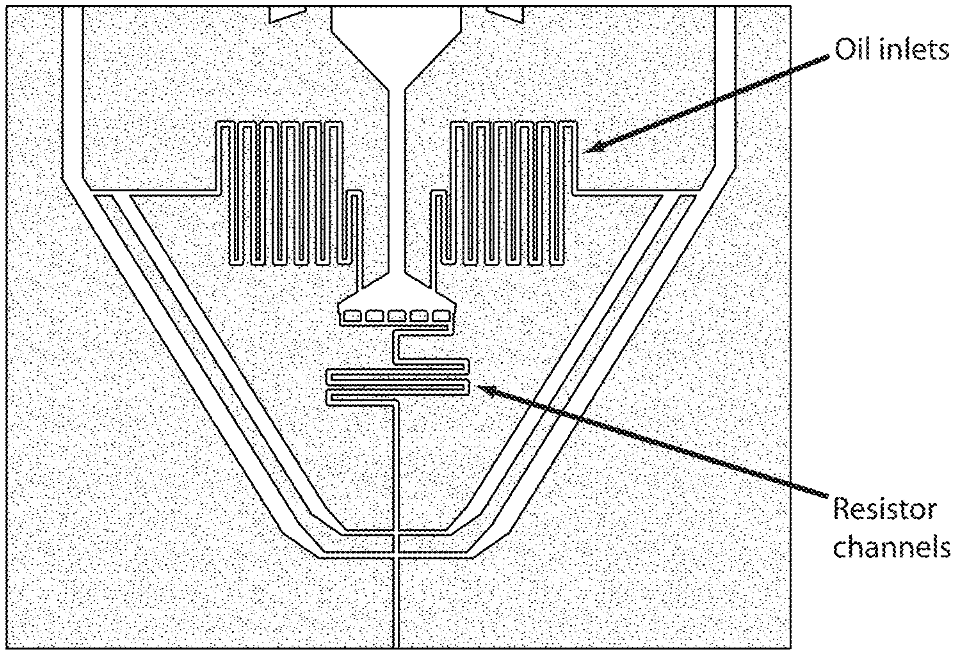
Figure 7F:
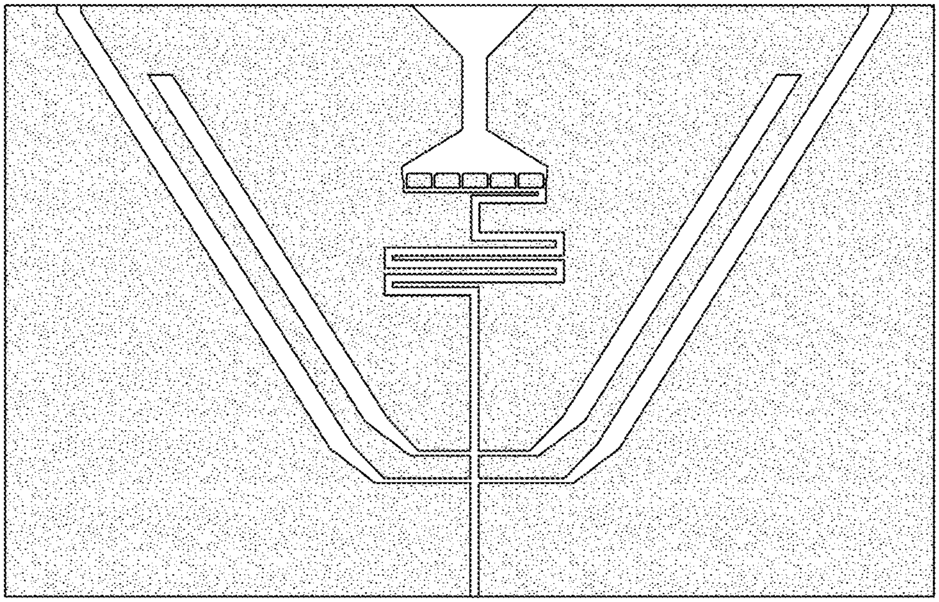
Figure 7G:
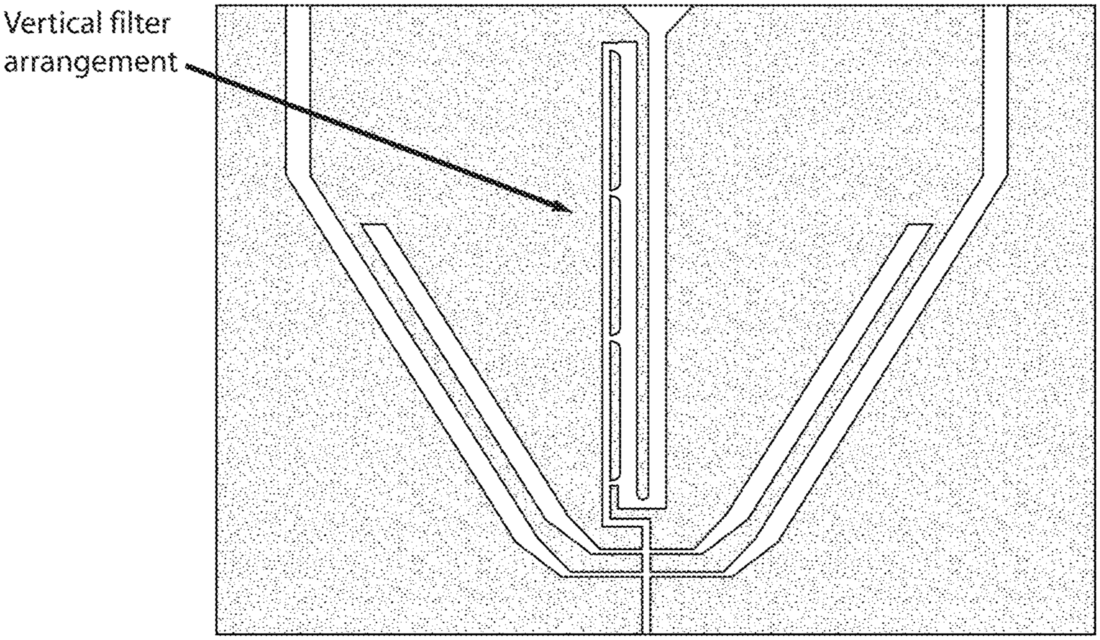
Figure 7H:
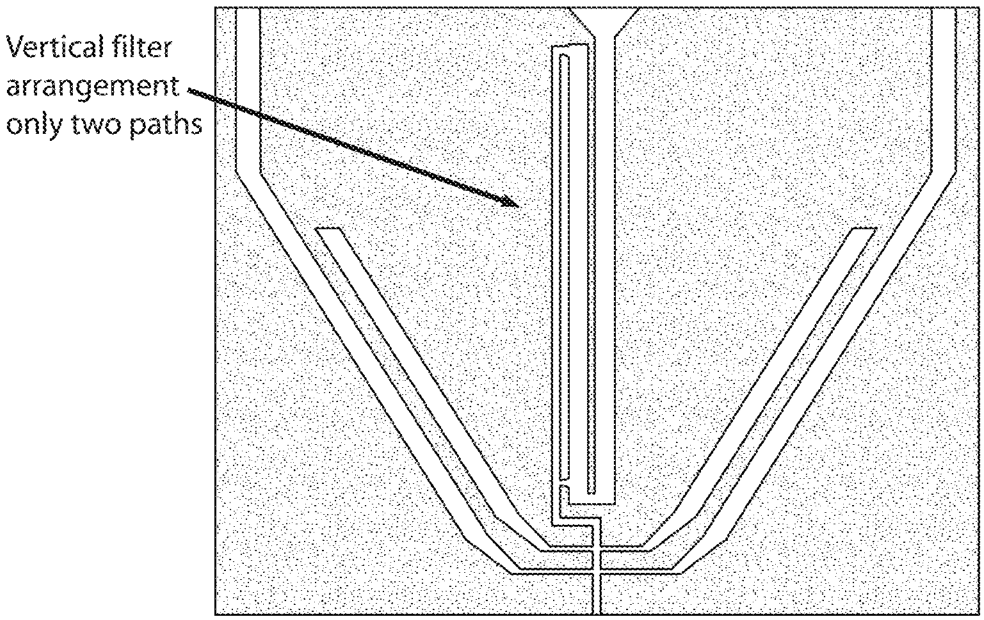

The size of the gaps between the posts may be selected such that the size of each gap is about 20%, about 30%, about 40%, about 50%, about 60%, about 70%, about 80%, or about 90% of the size of the outlet of the filter, or the size of a cross-section distance of a channel in which the fluid may flow through following exiting the filter. The size may be determined as the shortest distance separating adjacent posts in the filter. In some cases, the size of the gap between posts is about 50% the width of the channel. The posts may be of any suitable size, shape, and/or number, and be positioned in any suitable arrangement within the filter. Non-limiting examples of shapes are depicted in FIG. 6D and include, but are not limited to, rectangle, square, circle, oval, trapezoid, teardrop (e.g., with both square and circular bottom edges), and triangle. In some embodiments, the length of a post may be substantially greater than the width of the post, or the width of a post may be substantially greater than the length of the post. For example, the length or width of the post may be about 2 times, about 3 times, about 4 times, about 5 times, about 10 times, about 15 times, about 20 times, or greater, than the width or length, respectively, of the post. In some cases, when the length of the post is substantially greater than the width of the post, the gaps between two posts may form a channel. The posts within the filter may or may not be of the same size, shape, and/or arrangement. For example, in some cases, substantially all of the posts may have the same size, shape, and arrangement, whereas, in other cases, the posts may have a variety of sizes, shapes, and/or arrangements.

The filter may comprise about 5, about 6, about 7, about 8, about 9, about 10, about 11, about 12, about 15, about 20, or more, posts. The width of the posts may be about the same size, or about 1.5 times greater, about 2 times greater, about 3 times greater, about 4 times greater, about 5 times greater, about 7 times greater, or about 10 times greater, than the size of the gap between the posts. The posts may be arranged in a linear arrangement, e.g., as is shown in FIG. 6B, and/or in other arrangements, including multiple lines of posts (rectangularly arrayed, staggered, etc.) or randomly arrangements of posts. In some cases, the posts may be associated with any suitable surface of the channel (e.g., bottom, top, and/or walls of the channel). In some cases, the posts may be arranged in a three-dimensional arrangement. In some cases, the height of the microfluidic channel may vary and/or the height of the posts may vary. If lines of posts are present, they may be arranged approximately 90° relative to the inlet and outlet of the filter, or at a non-90° angle. In some cases, at least about 50%, about 60%, about 70%, about 80%, about 90%, about 95%, about 98%, or more, of particulate matter present within a fluid may be removed from the fluid by the filter.

It should be understood that although the filters described above are described relative to a droplet maker such as those described herein, the filter is not limited to only such applications. The use of filters in other microfluidic applications is contemplated, including any application in which the removal of particulates is desired (whether or not droplets are present within the fluid within the channel). Non-limiting examples of such application include microfluidic applications (e.g., "lab-on-a-chip" applications), chromatography applications (e.g., liquid chromatography such as HPLC, affinity chromatography, ion exchange chromatography, size exclusion chromatography, etc.), semiconductor manufacturing techniques, potable water applications, inkjet printing applications, enzymatic analysis, DNA analysis, or the like.

In some embodiments, the height of the microfluidic channel prior to the filter may rapidly decrease in height (e.g., a sharp shortening of the height of the channel). This may cause at least a portion of the dust or other particulates to settle prior to entering the tunnel with decreased height.

In some cases, one or more channels may intersect with the filter. The channel may intersect with the filter at a location prior to, adjacent with, or following the posts. In some cases, the channel may be located in between one or more sets of posts. The association of a channel with the filter may allow for the addition or extraction of a continuous phase from the fluid entering the filter. In some cases, the channel may be used to introduce a continuous phase that differs from the continuous phase present in the fluid entering the filter. In some cases, the channel may be a capacitor channel, wherein a capacitor channel is a dead-end channel. A capacitor channel may aid in evening out the pressure in the droplet maker, and/or aid in forming a highly monodispersed plurality of droplets.

In some cases, a component may be associated with a filter (or other part of the microfluidic system) to aid in reducing froth. The term "froth" is given its ordinary meaning in the art. The presence of froth in the filter or other part of the microfluidic system (e.g., droplet maker) may disrupt fluid flow and/or lead to other difficulties (e.g., increase the polydispersity of the droplets formed at the droplet maker). In some cases, the froth may be reduced or eliminated using a wetting patch, electric field, and/or surfactants (e.g., present in one or more fluid).

The composition and methods as described herein can be used in a variety of applications, for example, such as techniques relating to fields such as food and beverages, health and beauty aids, paints and coatings, and drugs and drug delivery. A droplet or emulsion can also serve as a reaction vessel in certain cases, such as for controlling chemical reactions, or for in vitro transcription and translation, e.g., for directed evolution technology. In addition, droplets of the present invention may comprise additional reaction components, for example, catalysts, enzymes, inhibitors, and the like. In some embodiments, a plurality of divided droplets comprising species may be useful in determining an analyte.

The term "determining," as used herein, generally refers to the analysis or measurement of a target analyte molecule, for example, quantitatively or qualitatively, or the detection of the presence or absence of a target analyte molecule. "Determining" may also refer to the analysis or measurement of an interaction between at least one species and a target analyte molecule, for example, quantitatively or qualitatively, or by detecting the presence or absence of the interaction. Example techniques include, but are not limited to, spectroscopy such as infrared, absorption, fluorescence, UV/visible, FTIR ("Fourier Transform Infrared Spectroscopy"), or Raman; gravimetric techniques; ellipsometry; piezoelectric measurements; immunoassays; electrochemical measurements; optical measurements such as optical density measurements; circular dichroism; light scattering measurements such as quasielectric light scattering; polarimetry; refractometry; or turbidity measurements.

In some cases, the compositions and methods may be useful for the sequencing of a target nucleic acid. For example, a target analyte molecule may be a nucleic acid and the species comprised in a plurality of divided droplets may be selected from a library of nucleic acid probes, such that the sequence of the nucleic acid may be determined, for example, using techniques such as those disclosed in International Patent Application No. PCT/US2008/013912, filed Dec. 19, 2008, entitled "Systems and Methods for Nucleic Acid Sequencing," by Weitz, et al.; or U.S. Provisional Patent Application Ser. No. 61/098,674, filed Sep. 19, 2008, entitled "Creation of Libraries of Droplets and Related Species," by Weitz, et al., each herein incorporated by reference.

In some embodiments, the techniques disclosed herein may be used for creating an emulsion comprising a plurality of groups of droplets, where each of the different groups of droplets comprising a distinguishable nucleic acid probe. For instance, each group of divided droplets may comprise one or more additional species, for example, where the species may be used to identify the nucleic acid probe. In some cases, the library of droplets may be used for sequencing, e.g., of nucleic acids. For instance, at least some of the collection of droplets may be fused with a droplets comprising a target nucleic acid, thereby forming a plurality of fused droplets. The plurality of fused droplets may be analyzed to determine the sequence of the nucleic acid using techniques known to those of ordinary skill in the art (e.g., sequencing-by-hybridization techniques).

In one embodiment, a plurality of distinguishable identification elements are used to identify a plurality of divided droplets or nucleic acid probes or other suitable samples. An "identification element" as used herein, is a species that includes a component that can be determined in some fashion, e.g., the identification element may be identified when contained within a droplet. For instance, if fluorescent particles are used, a set of distinguishable particles is first determined, e.g., having at least 5 distinguishable particles, at least about 10 distinguishable particles, at least about 20 distinguishable particles, at least about 30 distinguishable particles, at least about 40 distinguishable particles, at least about 50 distinguishable particles, at least about 75 distinguishable particles, or at least about 100 or more distinguishable particles. A non-limiting example of such a set is available from Luminex. The distinguishable identification elements may be divided into a plurality of groups (e.g., 2, 3, 4, 5, 6, 7, or more), where each group contains at least two members of the set of distinguishable identification elements.

In some embodiments, droplets of the present invention comprise a precursor material, where the precursor material is capable of undergoing a phase change, e.g., to form a rigidified droplet or a fluidized droplet. For instance, a droplet may contain a gel precursor and/or a polymer precursor that can be rigidified to form a rigidified droplet comprising a gel and/or a polymer. Thus, the above methods and processes can be used in some cases to form a collection of particles comprising a plurality of groups of particles, each group of particles distinguishable from the other groups of particles. The rigidified droplet, in some cases, may also contain a fluid within the gel or polymer. A droplet may be caused to undergo a phase change using any suitable technique. For example, a rigidified droplet may form a fluidized droplet by exposing the rigidified droplet to an environmental change. A droplet may be fluidized or rigidified by a change in the environment around the droplet, for example, a change in temperature, a change in the pH level, change in ionic strength, exposure to an electromagnetic radiation (e.g., ultraviolet light), addition of a chemical (e.g., chemical that cleaves a crosslinker in a polymer), and the like.

A variety of definitions are now provided which will aid in understanding various aspects of the invention. Following, and interspersed with these definitions, is further disclosure that will more fully describe the invention.

In one embodiment, a kit may be provided, containing one or more of the above compositions. A "kit," as used herein, typically defines a package or an assembly including one or more of the compositions of the invention, and/or other compositions associated with the invention, for example, a collection of droplets as previously described. Each of the compositions of the kit may be provided in liquid form (e.g., in solution), in solid form (e.g., a dried powder or collection of hardened droplets), etc. A kit of the invention may, in some cases, include instructions in any form that are provided in connection with the compositions of the invention in such a manner that one of ordinary skill in the art would recognize that the instructions are to be associated with the compositions of the invention. For instance, the instructions may include instructions for the use, modification, mixing, diluting, preserving, administering, assembly, storage, packaging, and/or preparation of the compositions and/or other compositions associated with the kit. The instructions may be provided in any form recognizable by one of ordinary skill in the art as a suitable vehicle for containing such instructions, for example, written or published, verbal, audible (e.g., telephonic), digital, optical, visual (e.g., videotape, DVD, etc.) or electronic communications (including Internet or web-based communications), provided in any manner.

A "droplet," as used herein, is an isolated portion of a first fluid that is completely surrounded by a second fluid. It is to be noted that a droplet is not necessarily spherical, but may assume other shapes as well, for example, depending on the external environment. The diameter of a droplet, in a non-spherical droplet, is the diameter of a perfect mathematical sphere having the same volume as the non-spherical droplet. The droplets may be created using any suitable technique, as previously discussed.

As used herein, a "fluid" is given its ordinary meaning, i.e., a liquid or a gas. A fluid cannot maintain a defined shape and will flow during an observable time frame to fill the container in which it is put. Thus, the fluid may have any suitable viscosity that permits flow. If two or more fluids are present, each fluid may be independently selected among essentially any fluids (liquids, gases, and the like) by those of ordinary skill in the art.

Certain embodiments of the present in invention provide a plurality of droplets. In some embodiments, the plurality of droplets is formed from a first fluid, and may be substantially surrounded by a second fluid. As used herein, a droplet is "surrounded" by a fluid if a closed loop can be drawn around the droplet through only the fluid. A droplet is "completely surrounded" if closed loops going through only the fluid can be drawn around the droplet regardless of direction. A droplet is "substantially surrounded" if the loops going through only the fluid can be drawn around the droplet depending on the direction (e.g., in some cases, a loop around the droplet will comprise mostly of the fluid by may also comprise a second fluid, or a second droplet, etc.).

In most, but not all embodiments, the droplet and the fluid containing the droplet are substantially immiscible. In some cases, however, the may be miscible. In some cases, a hydrophilic liquid may be suspended in a hydrophobic liquid, a hydrophobic liquid may be suspended in a hydrophilic liquid, a gas bubble may be suspended in a liquid, etc. Typically, a hydrophobic liquid and a hydrophilic liquid are substantially immiscible with respect to each other, where the hydrophilic liquid has a greater affinity to water than does the hydrophobic liquid. Examples of hydrophilic liquids include, but are not limited to, water and other aqueous solutions comprising water, such as cell or biological media, ethanol, salt solutions, etc. Examples of hydrophobic liquids include, but are not limited to, oils such as hydrocarbons, silicon oils, fluorocarbon oils, organic solvents etc. In some cases, two fluids can be selected to be substantially immiscible within the time frame of formation of a stream of fluids. Those of ordinary skill in the art can select suitable substantially miscible or substantially immiscible fluids, using contact angle measurements or the like, to carry out the techniques of the invention.

In some, but not all embodiments, the plurality of the droplets may be produced using microfluidic techniques, as discussed more herein. "Microfluidic," as used herein, refers to a device, apparatus or system including at least one fluid channel having a cross-sectional dimension of less than 1 mm, and a ratio of length to largest cross-sectional dimension of at least about 3:1. A "microfluidic channel," as used herein, is a channel meeting these criteria. The "cross-sectional dimension" of the channel is measured perpendicular to the direction of fluid flow. In some embodiments, the fluid channels may be formed in part by a single component (e.g., an etched substrate or molded unit). Of course, larger channels, tubes, chambers, reservoirs, etc. can be used to store fluids in bulk and to deliver fluids to components of the invention. In one set of embodiments, the maximum cross-sectional dimension of the channel(s) containing embodiments of the invention are less than 1 mm, less than 500 microns, less than 200 microns, less than 100 microns, less than 50 microns, or less than 25 microns. In some cases the dimensions of the channel may be chosen such that fluid is able to freely flow through the article or substrate. The dimensions of the channel may also be chosen, for example, to allow a certain volumetric or linear flowrate of fluid in the channel. Of course, the number of channels and the shape of the channels can be varied by any method known to those of ordinary skill in the art. In some cases, more than one channel or capillary may be used. For example, two or more channels may be used, where they are positioned inside each other, positioned adjacent to each other, positioned to intersect with each other, etc.

A "channel," as used herein, means a feature on or in an article (substrate) that at least partially directs the flow of a fluid. The channel can have any cross-sectional shape (circular, oval, triangular, irregular, square, or rectangular, or the like) and can be covered or uncovered. In embodiments where it is completely covered, at least one portion of the channel can have a cross-section that is completely enclosed, or the entire channel may be completely enclosed along its entire length with the exception of its inlet(s) and outlet(s). A channel may also have an aspect ratio (length to average cross sectional dimension) of at least about 3:1, at least about 5:1, or at least about 10:1 or more. An open channel generally will include characteristics that facilitate control over fluid transport, e.g., structural characteristics (an elongated indentation) and/or physical or chemical characteristics (hydrophobicity vs. hydrophilicity) or other characteristics that can exert a force (e.g., a containing force) on a fluid. The fluid within the channel may partially or completely fill the channel. In some cases where an open channel is used, the fluid may be held within the channel, for example, using surface tension (i.e., a concave or convex meniscus).

Non-limiting examples of microfluidic systems that may be used with the present invention are disclosed in U.S. patent application Ser. No. 11/246,911, filed Oct. 7, 2005, entitled "Formation and Control of Fluidic Species," published as U.S. Patent Application Publication No. 2006/0163385 on Jul. 27, 2006; U.S. patent application Ser. No. 11/024,228, filed Dec. 28, 2004, entitled "Method and Apparatus for Fluid Dispersion," published as U.S. Patent Application Publication No. 2005/0172476 on Aug. 11, 2005; U.S. patent application Ser. No. 11/360,845, filed Feb. 23, 2006, entitled "Electronic Control of Fluidic Species," published as U.S. Patent Application Publication No. 2007/000342 on Jan. 4, 2007; International Patent Application No. PCT/US2006/007772, filed Mar. 3, 2006, entitled "Method and Apparatus for Forming Multiple Emulsions," published as WO 2006/096571 on Sep. 14, 2006; U.S. patent application Ser. No. 11/368,263, filed Mar. 3, 2006, entitled "Systems and Methods of Forming Particles," published as U.S. Patent Application Publication No. 2007/0054119 on Mar. 8, 2007; U.S. patent application Ser. No. 12/058,628, filed Mar. 28, 2008, entitled "Multiple Emulsions and Techniques for Formation," published as U.S. Patent Application Publication No. 2009/0012187 on Jan. 8, 2009; and International patent Application No. PCT/US2006/001938, filed Jan. 20, 2006, entitled "Systems and Methods for Forming Fluidic Droplets Encapsulated in Particles Such as Colloidal Particles," published as WO 2006/078841 on Jul. 27, 2006, each incorporated herein by reference.

In some embodiments, the microfluidic system provided may be used to manipulate droplets. For example, in some cases, a plurality droplets may be screened or sorted. For instance, a plurality of droplets may be screened or sorted for those droplets containing a species, and in some cases, the droplets may be screened or sorted for those droplets containing a particular number or range of entities of a species of interest. Systems and methods for screening and/or sorting droplets will be known to those of ordinary skill in the art, for example, as described in U.S. patent application Ser. No. 11/360,845, filed Feb. 23, 2006, entitled "Electronic Control of Fluidic Species," by Link, et al., published as U.S. Patent Application Publication No. 2007/000342 on Jan. 4, 2007, incorporated herein by reference. As a non-limiting example, by applying (or removing) a first electric field to a device (or a portion thereof), a droplet may be directed to a first region or channel; by applying (or removing) a second electric field to the device (or a portion thereof), the droplet may be directed to a second region or channel; by applying a third electric field to the device (or a portion thereof), the droplet may be directed to a third region or channel; etc., where the electric fields may differ in some way, for example, in intensity, direction, frequency, duration, etc.

In another aspect, a droplet may be further split or divided into two or more droplets. Methods, systems, and techniques for splitting a droplet will be known to those of ordinary skill in the art, for example, as described in International Patent Application Serial No. PCT/US2004/010903, filed Apr. 9, 2004 by Link, et al.; U.S. Provisional Patent Application Ser. No. 60/498,091, filed Aug. 27, 2003, by Link, et al.; and International Patent Application Serial No. PCT/US03/20542, filed Jun. 30, 2003 by Stone, et al., published as WO 2004/002627 on Jan. 8, 2004, each incorporated herein by reference. For example, a divided droplet can be split using an applied electric field. The electric field may be an AC field, a DC field, etc.

In some cases, a first droplet (e.g., a divided droplet) may be fused or coalesced with a second droplet. For example, in one set of embodiments, systems and methods are provided that are able to cause two or more droplets (e.g., arising from discontinuous streams of fluid) to fuse or coalesce into one droplet in cases where the two or more droplets ordinarily are unable to fuse or coalesce, for example, due to composition, surface tension, droplet size, the presence or absence of surfactants, etc. In other embodiments, a droplet may be fused with a fluidic stream. For example, a fluidic stream in a channel may be fused with one or more droplets in the same channel. In certain microfluidic systems, the surface tension of the droplets, relative to the size of the droplets, may also prevent fusion or coalescence of the droplets from occurring in some cases. Two or more droplets may be fused or coalesced using method, systems, and/or techniques known to those of ordinary skill in the art, for example, such as those described in U.S. patent application Ser. No. 11/024,228, filed Dec. 28, 2004, entitled "Method and Apparatus for Fluid Dispersion," by Stone, et al., published as U.S. Patent Application Publication No. 2005/0172476 on Aug. 11, 2005; U.S. patent application Ser. No. 11/246,911, filed Oct. 7, 2005, entitled "Formation and Control of Fluidic Species," by Link, et al., published as U.S. Patent Application Publication No. 2006/0163385 on Jul. 27, 2006; U.S. patent application Ser. No. 11/885,306, filed Aug. 29, 2007, entitled "Method and Apparatus for Forming Multiple Emulsions," by Weitz, et al., published as U.S. Patent Application No. 2009/0131543 on Mar. 21, 2009; or U.S. patent application Ser. No. 11/360,845, filed Feb. 23, 2006, entitled "Electronic Control of Fluidic Species," by Link, et al., published as U.S. Patent Application Publication No. 2007/0003442 on Jan. 4, 2007, each incorporated herein by reference. In some cases, a second fluid may be injected into a divided droplet, for example, as describe in a U.S. Provisional Patent Application No. 61/220,847, filed on Jun. 26, 2009, entitled "Fluid Injection," by Weitz, et al., incorporated herein by reference.

A variety of materials and methods, according to certain aspects of the invention, can be used to form any of the above-described components of the systems and devices of the invention. In some cases, the various materials selected lend themselves to various methods. For example, various components of the invention can be formed from solid materials, in which the channels can be formed via micromachining, film deposition processes such as spin coating and chemical vapor deposition, laser fabrication, photolithographic techniques, etching methods including wet chemical or plasma processes, and the like. See, for example, Scientific American, 248:44-55, 1983 (Angell, et al). In one embodiment, at least a portion of the fluidic system is formed of silicon by etching features in a silicon chip. Technologies for precise and efficient fabrication of various fluidic systems and devices of the invention from silicon are known. In another embodiment, various components of the systems and devices of the invention can be formed of a polymer, for example, an elastomeric polymer such as polydimethylsiloxane ("PDMS"), polytetrafluoroethylene ("PTFE" or Teflon®), or the like.

Different components can be fabricated of different materials. For example, a base portion including a bottom wall and side walls can be fabricated from an opaque material such as silicon or PDMS, and a top portion can be fabricated from a transparent or at least partially transparent material, such as glass or a transparent polymer, for observation and/or control of the fluidic process. Components can be coated so as to expose a desired chemical functionality to fluids that contact interior channel walls, where the base supporting material does not have a precise, desired functionality. For example, components can be fabricated as illustrated, with interior channel walls coated with another material. Material used to fabricate various components of the systems and devices of the invention, e.g., materials used to coat interior walls of fluid channels, may desirably be selected from among those materials that will not adversely affect or be affected by fluid flowing through the fluidic system, e.g., material(s) that is chemically inert in the presence of fluids to be used within the device.

In one embodiment, various components of the invention are fabricated from polymeric and/or flexible and/or elastomeric materials, and can be conveniently formed of a hardenable fluid, facilitating fabrication via molding (e.g. replica molding, injection molding, cast molding, etc.). The hardenable fluid can be essentially any fluid that can be induced to solidify, or that spontaneously solidifies, into a solid capable of containing and/or transporting fluids contemplated for use in and with the fluidic network. In one embodiment, the hardenable fluid comprises a polymeric liquid or a liquid polymeric precursor (i.e. a "prepolymer"). Suitable polymeric liquids can include, for example, thermoplastic polymers, thermoset polymers, or mixture of such polymers heated above their melting point. As another example, a suitable polymeric liquid may include a solution of one or more polymers in a suitable solvent, which solution forms a solid polymeric material upon removal of the solvent, for example, by evaporation. Such polymeric materials, which can be solidified from, for example, a melt state or by solvent evaporation, are well known to those of ordinary skill in the art. A variety of polymeric materials, many of which are elastomeric, are suitable, and are also suitable for forming molds or mold masters, for embodiments where one or both of the mold masters is composed of an elastomeric material. A non-limiting list of examples of such polymers includes polymers of the general classes of silicone polymers, epoxy polymers, and acrylate polymers. Epoxy polymers are characterized by the presence of a three-membered cyclic ether group commonly referred to as an epoxy group, 1,2-epoxide, or oxirane. For example, diglycidyl ethers of bisphenol A can be used, in addition to compounds based on aromatic amine, triazine, and cycloaliphatic backbones. Another example includes the well-known Novolac polymers. Non-limiting examples of silicone elastomers suitable for use according to the invention include those formed from precursors including the chlorosilanes such as methylchlorosilanes, ethylchlorosilanes, phenylchlorosilanes, etc.

Silicone polymers are preferred in one set of embodiments, for example, the silicone elastomer polydimethylsiloxane. Non-limiting examples of PDMS polymers include those sold under the trademark Sylgard by Dow Chemical Co., Midland, Mich., and particularly Sylgard 182, Sylgard 184, and Sylgard 186. Silicone polymers including PDMS have several beneficial properties simplifying fabrication of the microfluidic structures of the invention. For instance, such materials are inexpensive, readily available, and can be solidified from a prepolymeric liquid via curing with heat. For example, PDMSs are typically curable by exposure of the prepolymeric liquid to temperatures of about, for example, about 65° C. to about 75° C. for exposure times of, for example, about an hour. Also, silicone polymers, such as PDMS, can be elastomeric and thus may be useful for forming very small features with relatively high aspect ratios, necessary in certain embodiments of the invention. Flexible (e.g., elastomeric) molds or masters can be advantageous in this regard.

One advantage of forming structures such as microfluidic structures of the invention from silicone polymers, such as PDMS, is the ability of such polymers to be oxidized, for example by exposure to an oxygen-containing plasma such as an air plasma, so that the oxidized structures contain, at their surface, chemical groups capable of cross-linking to other oxidized silicone polymer surfaces or to the oxidized surfaces of a variety of other polymeric and non-polymeric materials. Thus, components can be fabricated and then oxidized and essentially irreversibly sealed to other silicone polymer surfaces, or to the surfaces of other substrates reactive with the oxidized silicone polymer surfaces, without the need for separate adhesives or other sealing means. In most cases, sealing can be completed simply by contacting an oxidized silicone surface to another surface without the need to apply auxiliary pressure to form the seal. That is, the pre-oxidized silicone surface acts as a contact adhesive against suitable mating surfaces. Specifically, in addition to being irreversibly sealable to itself, oxidized silicone such as oxidized PDMS can also be sealed irreversibly to a range of oxidized materials other than itself including, for example, glass, silicon, silicon oxide, quartz, silicon nitride, polyethylene, polystyrene, glassy carbon, and epoxy polymers, which have been oxidized in a similar fashion to the PDMS surface (for example, via exposure to an oxygen-containing plasma). Oxidation and sealing methods useful in the context of the present invention, as well as overall molding techniques, are described in the art, for example, in an article entitled "Rapid Prototyping of Microfluidic Systems and Polydimethylsiloxane," Anal. Chem., 70:474-480, 1998 (Duffy et al.), incorporated herein by reference.

Another advantage to forming microfluidic structures of the invention (or interior, fluid-contacting surfaces) from oxidized silicone polymers is that these surfaces can be much more hydrophilic than the surfaces of typical elastomeric polymers (where a hydrophilic interior surface is desired). Such hydrophilic channel surfaces can thus be more easily filled and wetted with aqueous solutions than can structures comprised of typical, unoxidized elastomeric polymers or other hydrophobic materials.

In one embodiment, a bottom wall is formed of a material different from one or more side walls or a top wall, or other components. For example, the interior surface of a bottom wall can comprise the surface of a silicon wafer or microchip, or other substrate. Other components can, as described above, be sealed to such alternative substrates. Where it is desired to seal a component comprising a silicone polymer (e.g. PDMS) to a substrate (bottom wall) of different material, the substrate may be selected from the group of materials to which oxidized silicone polymer is able to irreversibly seal (e.g., glass, silicon, silicon oxide, quartz, silicon nitride, polyethylene, polystyrene, epoxy polymers, and glassy carbon surfaces which have been oxidized). Alternatively, other sealing techniques can be used, as would be apparent to those of ordinary skill in the art, including, but not limited to, the use of separate adhesives, thermal bonding, solvent bonding, ultrasonic welding, etc.

U.S. Provisional Patent Application Ser. No. 61/255,239, filed Oct. 27, 2009, entitled "Droplet Creation Techniques," by Weitz, et al., is incorporated herein by reference in its entirety.

The following examples are intended to illustrate certain embodiments of the present invention, but do not exemplify the full scope of the invention.

Example 1

The following example describes the formation of a plurality of droplets, according to one non-limiting embodiment. Specifically, this example shows a controlled and scalable method to form a large emulsion library. The method is automated, requiring little intervention by the user. It is also parallelized, allowing quick production of a library.

In this example, the method comprises three steps, as shown in FIG. 1. In addition, the library comprises droplets comprising six distinguishable fluids (or fluid comprising 6 distinguishable species) for this particular example. The different fluids that are to make up the library are placed into separate containers 16, as shown in FIG. 1; this can be done using automated pipetting techniques, robots, or any other suitable technique.

The solutions for each container then pass into common container 4 filled with carrying fluid 24 that is not substantially miscible with the six distinguishable fluids from containers 16. This process forms six groups of indistinguishable droplets within common container 4, where the groups themselves are distinguishable, but within each group, the compositions of the droplets are indistinguishable. In this example, the plurality of droplets 2, in this embodiment, may be formed to be large and polydisperse (and are not necessarily microfluidic droplets), and are formed in a matter of minutes. There may be no transfer of fluids between droplets, enabling the droplets to be pooled together within common container 4, without substantially merger of the different droplets. In addition, since the droplets may be formed to be large, in some cases, large quantities can be formed in parallel and in a matter of seconds using standard parallel pipetters, or other commonly known techniques.

At least a portion of plurality of droplets 2 may flow into microfluidic channel 18 associated with droplet maker 10 (e.g., comprising channels 20 and 22), one droplet at a time. For example, droplet 12 enters microfluidic channel 18 and plurality of divided droplets 14 are formed as the stream of fluid from droplet 12 passes through the droplet maker 10. This process may be repeated with any number of droplets (e.g., droplets 30 and 32), thereby forming a substantially monodisperse plurality of droplets 6 that are substantially indistinguishable. The droplets prior to division may be large and/or polydisperse, and thus, may flow as plugs (e.g., streams of fluids) through the microfluidic channel towards the droplet maker.

Droplet maker 10 may cause the droplets to be divided to form into a plurality of substantially monodisperse droplets that are substantially indistinguishable. Various droplets may thus be passed through the droplet maker to each form a plurality of droplets that are substantially monodisperse and/or indistinguishable, thereby forming collection 6 comprising a plurality of groups of divided droplets (e.g., each group being formed by division of droplets having substantially indistinguishable compositions, e.g., carrying the same species). In some embodiments, the divided droplets formed by the droplet maker may be formed to be substantially monodisperse (e.g., within 1%). In some cases, to form substantially monodisperse droplets the initial plurality of droplets may be much larger (e.g., at least about 5 times) than the desired size of the divided droplets.

This method is also scalable in some cases. The plurality of droplets prior to division can be formed in a highly parallelized manner using standard parallel pipetters or other known techniques. With robots, this can be accomplished even faster. The formation of the divided droplets from the plurality droplets can also be parallelized, for instance, by passing the plurality of droplets into an array of microfluidic droplet makers or bifurcating channels, etc.

Example 2

This example illustrates a collection of two groups of droplets, where each group can be distinguished by composition, but the droplets of each of the groups themselves are compositionally indistinguishable.

Figure 2:
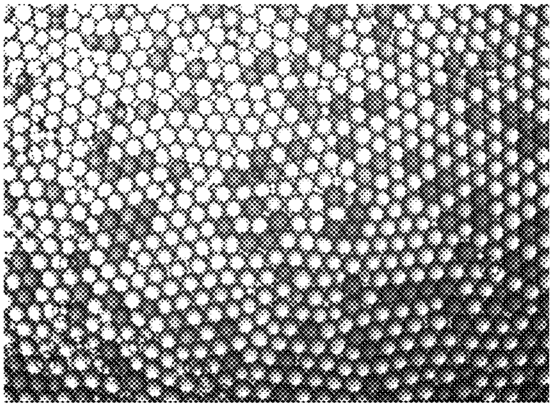
FIG. 2 shows an image of a collection of droplets comprising two groups of substantially indistinguishable droplets, according to another embodiment of the invention.

In this non-limiting example, two aqueous solutions were prepared, one containing a solution comprising 5 mM bromophenol blue and the other containing distilled water. The solutions were pre-emulsified in HFE-7500 with a surfactant. The pre-emulsion droplets were loaded into a syringe with a wide needle attached to PE/5 tubing. More specifically, to load the pre-emulsion droplets, the tubing was crimped with a binder clip and the piston was removed from the syringe. The pre-emulsion was poured into the back of the syringe and the piston was re-inserted and the syringe was flipped so that the needle was facing up. The binder clip was removed and any air in the syringe was pushed out. At this point, the syringe contained a collection of droplets which were either clear (e.g., comprising water) or blue (e.g., comprising a solution containing bromophenol blue). The droplets had an average diameter of approximately 2 mm. The syringe was then placed on a syringe pump which pumped the pre-emulsion into a microfluidic flow-focus droplet maker where additional oil was added. The flow rates of the pre-emulsion and oil were 700 uL/hr and 1100 uL/hr, respectively. This process caused a plurality of divided droplets to be formed from each larger droplet. The divided droplets were then collected into a 3 mL syringe containing 1 mL of FC40 fluorocarbon oil. The divided droplets dripped into the syringe and formed a cream that rose to the top. After all the larger droplets had been divided into divided droplets, the collection syringe was rotated for about 30 seconds to evenly distribute the divided droplets in the container. A small sample of the divided droplets was then placed onto a glass slide which was imaged (FIG. 2) with a bright-field microscope. In this image, two populations of droplet are clearly visible, that is, the droplets comprising the clear water and the droplets comprising the dye. The droplets all have about the same diameter on average.

Example 3

This example illustrates a collection comprising a plurality of groups of droplets, where each group can be distinguished by composition, but the droplets of each of the groups themselves are compositionally indistinguishable.

In this example, to pre-emulsify the solutions, each solution was pipetted into a vial filled with a carrier oil (HFE- 7500 fluorocarbon oil) and surfactant (E0665 which comprises a hydrophilic PEG head group attached to a perfluorinated di-block tail). The process of pipetting the solutions into the oil causes large droplets to form that are stabilized against coalescence by the surfactant. This process formed a collection of large polydisperse droplets comprising distinguishable groups of droplets formed from each solution. To form a monodisperse collection of smaller droplets (e.g., divided droplets) from the collection of larger droplets, the larger droplets were further emulsified using a microfluidic droplet maker. To do so, a flow-focused droplet maker having a droplet maker nozzle cross-sectional dimensions of 25×25 um (micrometer) was used. The droplet maker was fabricated in poly(dimethylsiloxane) (PDMS) using soft lithography. To cause the fluorocarbon oil to wet the device surfaces and encapsulate the aqueous solutions, the channels were chemically treated to make them hydrophobic. The channels were filled with Aquapel and allowed to sit for 30 seconds, after which air was flowed through the channels to remove excess Aquapel. The device was then heated in an oven set to 65° C. for 5 minutes before being used.

The volume of the larger droplets was much greater than that of the microfluidic droplet maker. As a result, the larger droplets formed long, unbroken streams or plugs of fluid when flowed through the droplet maker. The long plugs of fluid were formed into a monodisperse plurality of divided droplets using a method similar to the method described in Example 2. Without wishing to be bound by theory, in some cases, a moderately polydisperse collection of divided droplets might arise due to the finite size of the plugs. For example, at the end of the plug, there may not be enough fluid to form a divided droplet of the desired size. However, in instances where the volume of the larger droplets are at least about 5 times or more the size of the divided droplets (e.g., 100 times), the divided droplets formed can be monodisperse or substantially monodisperse. For example, for a larger droplets with a diameter of about 2 mm, if the divided droplets formed have a diameter of about 20 um, the larger droplets is about one million times larger than the divided droplets and thus, such effects do not contribute significantly to polydispersity.

The plurality of divided droplets was collected into a collection chamber comprising FC40 fluorocarbon oil, therefore pooling all the divided droplets together. The presence of the FC40 oil, in this example, increased the surface tension of the droplets, making the droplets more rigid and resistant to shear, and also reduced partitioning of solutes into the continuous phase, facilitating encapsulation. After all of the divided droplets were collected, the collection chamber was gently rotated for about 30 seconds to evenly distribute the droplets in the chamber.

In some cases, it may be important to ensure that the oil and surfactant combination used for forming the larger droplets are selected such that the droplets are stable against coalescence. It has been found, in this example, that the use of HFE-7500 with the PEG-perfluorinated-diblock surfactant yielded extremely stable collection of larger droplets, as illustrated in FIG. 3A which shows an the image of the packed pre-emulsion consisting of distilled water (clear) and bromophenol blue dyed (blue-black) droplets. It should be understood, however, that stable collections of droplets can be made with a variety of other fluorocarbon, hydrocarbon, and silicon oils and surfactants. In addition, the oil and surfactants used for the pre-emulsion need not be the same as those used for the micro-emulsification step since different oils often have different specific gravity, allowing unwanted phases to be separated with centrifugation. This makes the method very flexible with respect to the choice of oils and surfactants.

In some cases, it is also important to remove unwanted particulate from the collection of larger droplets just before the droplets enter the microfluidic droplet maker. This is because the microfluidic droplet maker comprises narrow channels and the absence of a filter may result in clogging of the device. Typical microfluidic filters comprise an arrays of posts having narrow gaps between them; the posts filter out the unwanted particulate while allowing fluid to flow around, into the droplet maker. Such a filter may cause a larger droplets to split into small, polydisperse droplets when the droplets are passed through the filter. The small, polydisperse droplets then enter the microfluidic droplets maker and can result in a polydisperse library of divided droplets being formed. To avoid the larger droplet being split by the filter, a specialized filter was formed which removed any particulate while also preventing the larger droplets from splitting. The filter comprised gaps between posts having different path lengths to the droplet maker, and thus different hydrodynamic resistance. An image of the filter is shown in FIG. 3B. More specifically, the gap to the far left of the figure has the shortest path length and the lowest hydrodynamic resistance whereas the gap to the far right of the figure has the longest path length and largest hydrodynamic resistance. As a result, when a larger droplet enters the filter, it flows through the first gap only and remains a continuous plug. If a particulate enters the filter, it is caught in the gap, diverting flow around to the next gap which becomes the next path of least resistance. This filter allows particulate to be removed while also keeping the larger droplets intact.

As a demonstration of the effectiveness of this method and the ease with which it allows formation of a plurality of divided droplets being formed from a collection of larger droplets, a collection of droplets comprising eight different compositions were formed. To form the different compositions, aqueous solutions consisting of different concentrations of two fluorescent dyes (a green dye (fluorocien) and a red dye (Alexafluor 680)) were used. The eight different droplet types had with two different concentrations of green dye and four concentrations of red dye. The solutions were formed into large droplets as described above, and the larger droplets were then divided into a plurality of divided droplets (average diameter 35 um) as described above. The divided droplets formed were collected into a syringe containing FC40 which was rotated for 30 seconds to evenly distribute the droplets and then allowed to cream for 2 min, over which time the lighter aqueous droplets float to the top of the syringe while the heavier fluorocarbon oil sinks. The close-packed divided droplets were then re-injected into a microfluidic channel that was 1000 um wide 25 um tall. Since the average droplet diameter exceeded the height of the channel, the divided droplets flowed as a monolayer, allowing each droplet to be individually imaged.

Figure 4A:
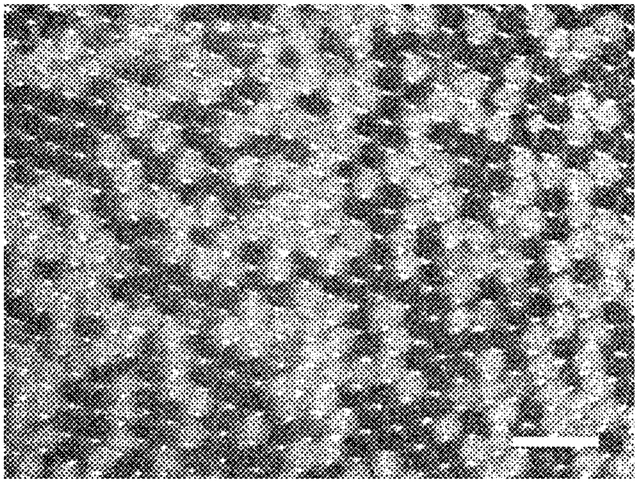
FIGS. 4A-4B show green and red channel images, respectively, of a plurality of droplets, according to a non-limiting embodiment of the invention.
Figure 4B:
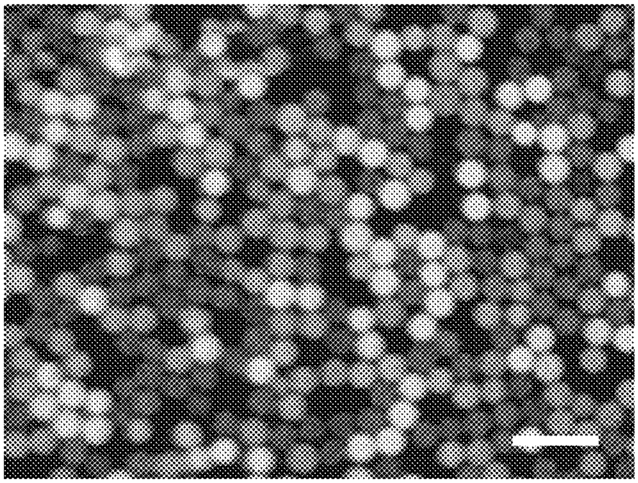

To excite the fluorescent dyes in the droplets, an epifluorescence microscope outfitted with a double band excitation filter and dichroic mirror was used; the optical components reflected wavelengths 480+/−10 nm and 660+/−10 nm (the excitation bands of the green and red dyes, respectively) into the sample, while allowing light emitted from the sample to pass. The emitted light was captured by the objective in the reverse direction and imaged by two CCD cameras. Before reaching the cameras, the light encountered a high-pass dichroic mirror (560 nm) which reflected green light and passed red light. The green light passed through a 540+/−10 nm emission filter before reaching one camera and the red light passed through a 690+/−10 nm emission filter before reaching a second camera. With the cameras and this optical setup, the green and red fluorescence in each divided droplet was simultaneously imaged. FIGS. 4A-4B show the green and red channel images, respectively, of the divided droplets.

Figure 5A:
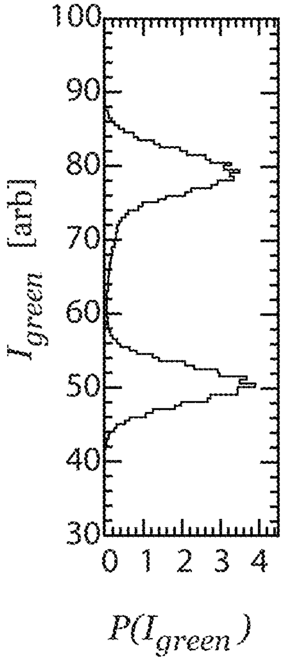
FIGS. 5A-5B show the intensity histograms for the green and red channel images shown in FIGS. 4A-4B, respectively.
Figure 5C:
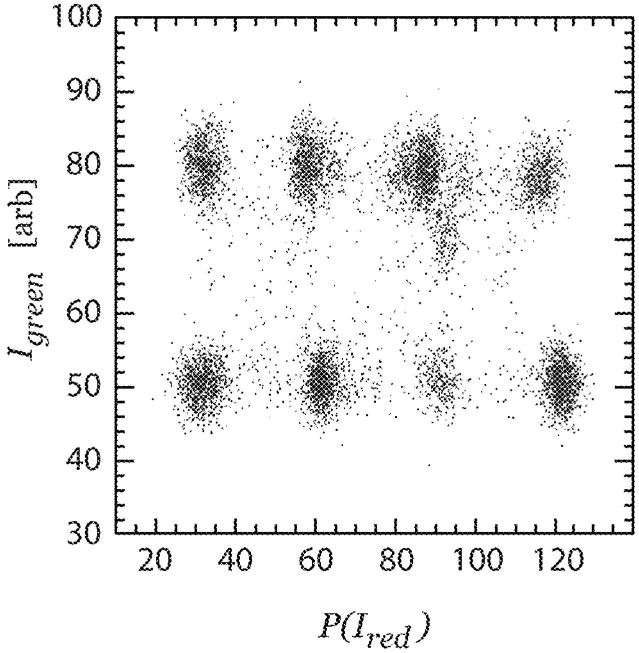
FIG. 5C shows a plot of the green intensity from FIG. 5A versus the red intensity from FIG. 5B.
Figure 5B:
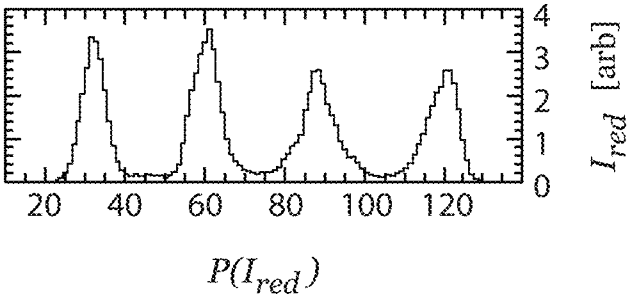

To measure the intensity of the droplets, an image analysis techniques was used to first identify the droplets and then measure the intensity of each droplets in both the green and red images. The green and red intensity values were stored in a data file for each droplet. The intensity histograms for the green and red channels are shown in FIGS. 5A-5B, respectively. As designed, the green channel shows two peaks and the red channel has four peaks, corresponding to the different concentrations of each dye. To demonstrate that the eight combinations can be used as optical labels for the droplets, the green intensity was plotted versus the red intensity for each droplet in FIG. 5C. The points clustered into eight different regions, each of which corresponds to a unique color code.

While several embodiments of the invention have been described and illustrated herein, those of ordinary skill in the art will readily envision a variety of other means and/or structures for performing the functions and/or obtaining the results and/or one or more of the advantages described herein, and each of such variations or modifications is deemed to be within the scope of the present invention. More generally, those skilled in the art will readily appreciate that all parameters, dimensions, materials, and configurations described herein are meant to be exemplary and that the actual parameters, dimensions, materials, and configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and/or claimed. The present invention is directed to each individual feature, system, material and/or method described herein. In addition, any combination of two or more such features, systems, articles, materials and/or methods, if such features, systems, articles, materials and/or methods are not mutually inconsistent, is included within the scope of the present invention.

All definitions as used herein are solely for the purposes of this disclosure. These definitions should not necessarily be imputed to other commonly-owned patents and/or patent applications, whether related or unrelated to this disclosure. The definitions, as used herein, should be understood to control over dictionary definitions, definitions in documents incorporated by reference, and/or ordinary meanings of the defined terms.

It should also be understood that, unless clearly indicated to the contrary, in any methods claimed herein that include more than one act, the order of the acts of the method is not necessarily limited to the order in which the acts of the method are recited.

In the claims, as well as in the specification above, all transitional phrases such as “comprising,” “including,” “carrying,” “having,” “involving,” “holding,” and the like are to be understood to be open-ended, i.e., to mean including but not limited to. Only the transitional phrases “consisting of” and “consisting essentially of” shall be closed or semi-closed transitional phrases, respectively, as set forth in the United States Patent Office Manual of Patent Examining Procedure, Section 2111.03.

What is claimed is:

1. A method for forming a plurality of divided droplets, comprising:

providing a plurality of droplets, each droplet comprising a first fluid surrounded by a second fluid, wherein groups of the plurality of droplets are distinguished from other groups of the plurality of droplets on the basis of composition and/or concentration of species contained within the droplets; and passing at least some of the droplets through a droplet maker such that each of the droplets passing through a microfluidic channel towards the droplet maker are divided by the droplet maker to form a collection of divided droplets, wherein the collection comprises a plurality of groups of divided droplets, where the divided droplets within each group are substantially indistinguishable but each group of divided droplets is distinguishable from the other groups of divided droplets wherein the plurality of droplets contains therein at least four distinguishable species, such that no more than about 5% of the droplets contains two or more of the at least four distinguishable species therein, wherein the at least four distinguishable species preferably comprises at least four distinguishable nucleic acids, at least four distinguishable identification elements or at least four distinguishable proteins.

2. The method of claim 1, wherein the droplet maker is a T-junction droplet maker.

3. The method of claim 1, wherein the droplet maker is a micro-capillary droplet maker.

4. The method of claim 1, wherein the first fluid and the second fluid are immiscible.

5. The method of claim 1, wherein the collection of divided droplets is surrounded by the second fluid.

6. The method of claim 1, wherein each group of divided droplets is distinguishable from the other groups of divided droplets due to different species contained within each group of droplets or on the basis of composition and/or concentration of the species contained within the droplets and/or the fluids forming the droplets.

7. The method of claim 1, wherein each of the droplets divided by the droplet maker is divided to form the same number of divided droplets as for each of the other droplets divided by the droplet maker.

8. The method of claim 1, wherein, for each of the droplets divided by the droplet maker, the divided droplets that are formed from each of the droplets have a distribution of diameters such that no more than 10% of the divided droplets have a diameter less than 75% of the average diameter of all of the divided droplets that are formed.

9. The method of claim 1, wherein the at least one droplet has an average diameter greater than 500 microns and the collection of divided droplets has an average diameter of less than 500 microns.

10. The method of claim 1, wherein at least 10 divided droplets are formed from a droplet of the plurality of droplets.

11. The method of claim 1, wherein the average diameter of the collection of divided droplets is less than 1000 microns.

12. The method of claim 1, wherein the collection of divided droplets is monodisperse.

13. The method of claim 1, comprising forming an emulsion comprising the collection of divided droplets.

14. The method of claim 3, wherein the droplet maker is a co-flow micro-capillary droplet maker.

15. The method of claim 1, wherein, for each of the droplets divided by the droplet maker, the divided droplets that are formed from each of the droplets have a distribution of diameters such that no more than 10% of the divided droplets have a diameter less than 80% of the average diameter of all of the divided droplets that are formed.

16. The method of claim 10, wherein at least 50 divided droplets are formed from a droplet of the plurality of droplets.

* * * * *